(12) United States Patent
Abe

(10) Patent No.: US 10,613,313 B2
(45) Date of Patent: *Apr. 7, 2020

(54) MICROSCOPY SYSTEM, MICROSCOPY METHOD, AND COMPUTER-READABLE RECORDING MEDIUM

(71) Applicant: OLYMPUS CORPORATION, Tokyo (JP)

(72) Inventor: Yoko Abe, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 15/782,920

(22) Filed: Oct. 13, 2017

(65) Prior Publication Data

US 2018/0081162 A1 Mar. 22, 2018

Related U.S. Application Data

(63) Continuation of application No. PCT/JP2015/061742, filed on Apr. 16, 2015.

(51) Int. Cl.
*G02B 21/02* (2006.01)
*G02B 21/36* (2006.01)
(Continued)

(52) U.S. Cl.
CPC ......... *G02B 21/367* (2013.01); *G02B 21/241* (2013.01); *G06K 9/00127* (2013.01);
(Continued)

(58) Field of Classification Search
CPC .. G02B 21/025; G02B 21/088; G02B 21/241; G02B 21/26; G02B 21/367;
(Continued)

(56) References Cited

U.S. PATENT DOCUMENTS 5,124,842 A   6/1992  Honda et al.
5,148,502 A   9/1992  Tsujiuchi et al.
(Continued)

FOREIGN PATENT DOCUMENTS

JP   H01-309478 A   12/1989
JP   2005-017557 A   1/2005
(Continued)

OTHER PUBLICATIONS

Sinharoy "Scheimpflug with computational imaging to extend the depth of field of iris recognition systems" Section 4.2.2 Focusing with tilting, 2016.*

(Continued)

*Primary Examiner* — James T Boylan
(74) *Attorney, Agent, or Firm* — Scully, Scott, Murphy & Presser PC

(57) ABSTRACT

A microscopy system includes: an imaging unit that acquires an image by capturing an object image generated by an observation optical system; a shift unit that shifts a focal plane and a position of a field of view of the observation optical system; an imaging control unit that causes the imaging unit to acquire a multi-focus superimposed image including image information on planes in an optical axis direction of the observation optical system by shifting the focal plane and the position of the field of view during one exposure period; a shift amount acquisition processing unit that acquires a shift amount by which the position of the field of view is shifted; an all-in-focus image generation unit that generates all-in-focus images based on multi-focus superimposed images, respectively, acquired under conditions in which the shift amounts are different; and a display unit that displays the all-in-focus images.

6 Claims, 16 Drawing Sheets

(51) Int. Cl.
*G06T 7/00* (2017.01)
*G06K 9/00* (2006.01)
*G06T 5/00* (2006.01)
*G06K 9/20* (2006.01)
*G06T 5/50* (2006.01)
*G06K 9/32* (2006.01)
*G02B 21/24* (2006.01)
*G02B 21/08* (2006.01)
*G02B 21/26* (2006.01)

(52) U.S. Cl.
CPC ............ *G06K 9/209* (2013.01); *G06K 9/3233* (2013.01); *G06T 5/003* (2013.01); *G06T 5/50* (2013.01); *G06T 7/00* (2013.01); *G06T 7/0012* (2013.01); *G02B 21/025* (2013.01); *G02B 21/088* (2013.01); *G02B 21/26* (2013.01); *G02B 21/368* (2013.01); *G06T 2207/10056* (2013.01); *G06T 2207/10148* (2013.01); *G06T 2207/20221* (2013.01)

(58) Field of Classification Search
CPC .. G02B 21/368; G06K 9/00127; G06K 9/209; G06K 9/3233; G06T 2207/10056; G06T 2207/10148; G06T 2207/20221; G06T 5/003; G06T 5/50; G06T 7/00; G06T 7/0012
USPC .............................................. 348/79, 208.12
See application file for complete search history.

(56) References Cited

U.S. PATENT DOCUMENTS

| | | | |
|---|---|---|---|
| 2004/0264765 A1* | 12/2004 | Ohba | G02B 21/22 382/154 |
| 2005/0031192 A1* | 2/2005 | Sieckmann | G02B 21/002 382/154 |
| 2010/0321484 A1* | 12/2010 | Kishima | G02B 21/365 348/79 |
| 2012/0200673 A1 | 8/2012 | Tagawa et al. | |
| 2014/0022236 A1 | 1/2014 | Liu et al. | |
| 2016/0051215 A1* | 2/2016 | Chen | A61B 6/025 715/771 |
| 2018/0192030 A1* | 7/2018 | Greenberg | G02B 21/367 |
| 2019/0075247 A1* | 3/2019 | Vink | G02B 21/367 |
| 2019/0204577 A1* | 7/2019 | Faris | G02B 21/0088 |

FOREIGN PATENT DOCUMENTS

| | | |
|---|---|---|
| JP | 2008067915 A * | 3/2008 |
| JP | 2011-107669 A | 6/2011 |
| JP | 2014-021490 A | 2/2014 |
| WO | 2011/158498 A1 | 12/2011 |

OTHER PUBLICATIONS

International Search Report dated Jul. 21, 2015 received in PCT/JP2015/061742.

* cited by examiner

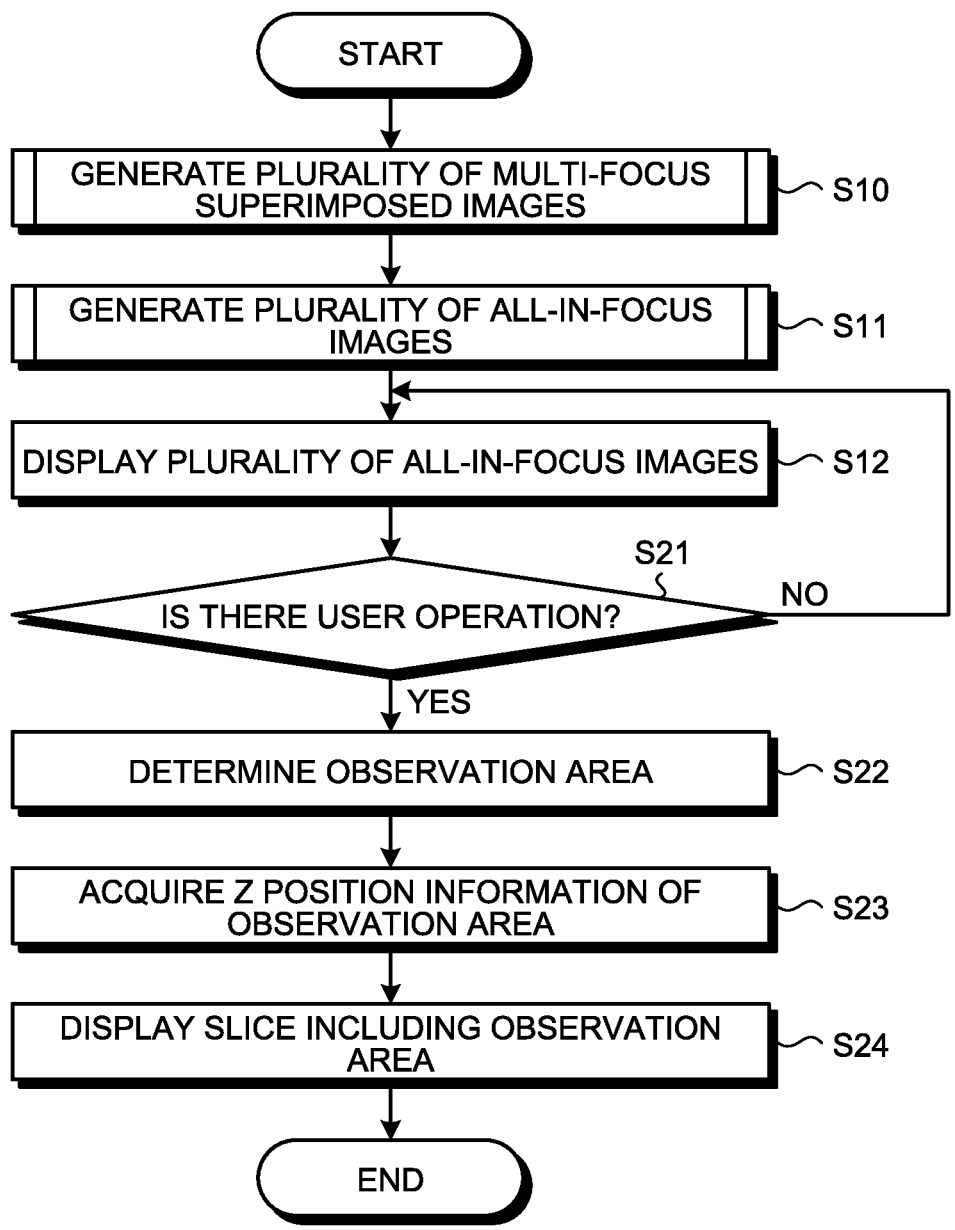

MICROSCOPY SYSTEM, MICROSCOPY METHOD, AND COMPUTER-READABLE RECORDING MEDIUM

CROSS-REFERENCE TO RELATED APPLICATION

This application is a continuation of PCT international application Ser. No. PCT/JP2015/061742 filed on Apr. 16, 2015 which designates the United States, incorporated herein by reference.

BACKGROUND

The present disclosure relates to a microscopy system, a microscopy method, and a computer-readable recording medium.

In the field of biology, medicine, and the like, there is a user need that when observing a thick object such as a cell nucleus or a stem cell by using a biological microscope having a focal depth level of several tens of μm, users want to promptly specify a region of interest located in a depth direction (Z direction) along the optical axis of an observation optical system. In response to such a need, there is known a technique with which a plurality of images having different focal planes is acquired by performing sequential imaging while shifting the focal plane of the observation optical system along the optical axis, and based on the plurality of images, an all-in-focus image that is focused at each position in the Z direction is generated. The plurality of images having different focal planes acquired in this way is also collectively called a Z stack image.

Examples of the method of generating an all-in-focus image include a method of restoring, using a blur function, a multi-focus image generated by superimposing Z stack images, and a method of extracting a focal area from each of a plurality of images having different focal planes and performing composition.

For example, WO 2011/158498 discloses a technique with which two images focused on the near-end side and the far-end side of an object and an all-in-focus image generated by imaging while sweeping an image sensor on the far-end side from the near-end side of the object are acquired, the images focused on the near-end side and the far-end side are restored using the all-in-focus image, thereby calculating an amount of blur in a partial area in the image, and as a result, a distance from an optical system to the object is acquired and a distance map is created.

SUMMARY

A microscopy system according to one aspect of the present disclosure may include: an imaging unit configured to acquire an image by capturing an object image generated by an observation optical system of a microscope; a shift unit configured to shift a focal plane and a position of a field of view of the observation optical system; an imaging control unit configured to cause the imaging unit to acquire a multi-focus superimposed image including image information on planes in an optical axis direction of the observation optical system by shifting the focal plane and the position of the field of view during one exposure period of the imaging unit; a shift amount acquisition processing unit configured to acquire a shift amount by which the position of the field of view is shifted; an all-in-focus image generation unit configured to generate all-in-focus images based on multi-focus superimposed images, respectively, acquired under conditions in which the shift amounts are different; and a display unit configured to display the all-in-focus images.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 14 is a flowchart illustrating an operation of the microscopy system illustrated in FIG. 13;

DETAILED DESCRIPTION

Hereinafter, embodiments of a microscopy system, a microscopy method, and a microscopy program according to the present disclosure will be described in detail below with reference to the drawings. Note that the present disclosure is not limited to these embodiments. Furthermore, in the description of each drawing, the same reference signs are given to the same parts.

First Embodiment

Figure 1:
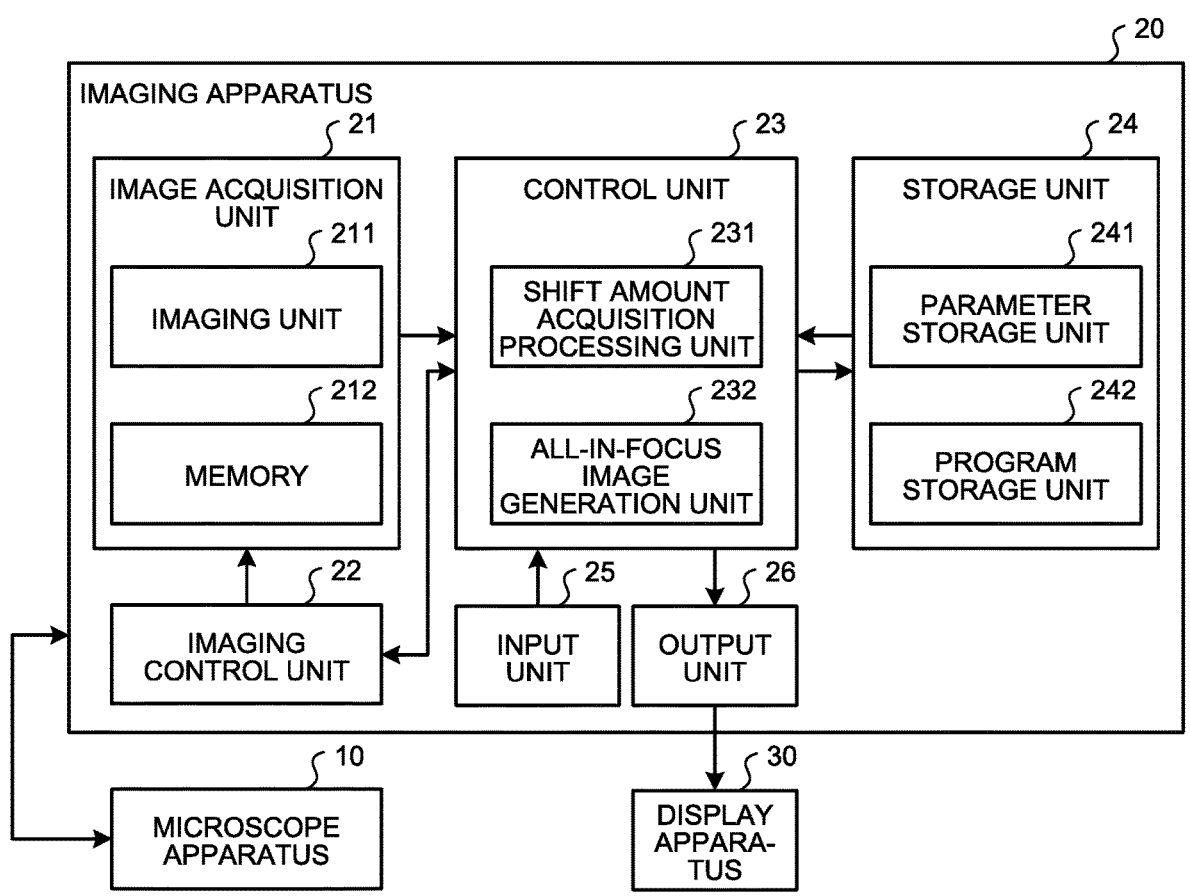
FIG. 1 is a block diagram illustrating an exemplary configuration of a microscopy system according to a first embodiment of the present disclosure.

FIG. 1 is a block diagram illustrating an exemplary configuration of a microscopy system according to a first embodiment of the present disclosure. As illustrated in FIG. 1, a microscopy system 1 according to the first embodiment includes a microscope apparatus 10 that generates an object image, an imaging apparatus 20 that acquires and processes an image of the enlarged image generated by the microscope apparatus 10, and a display apparatus 30 that displays the image processed by the imaging apparatus 20.

Figure 2:
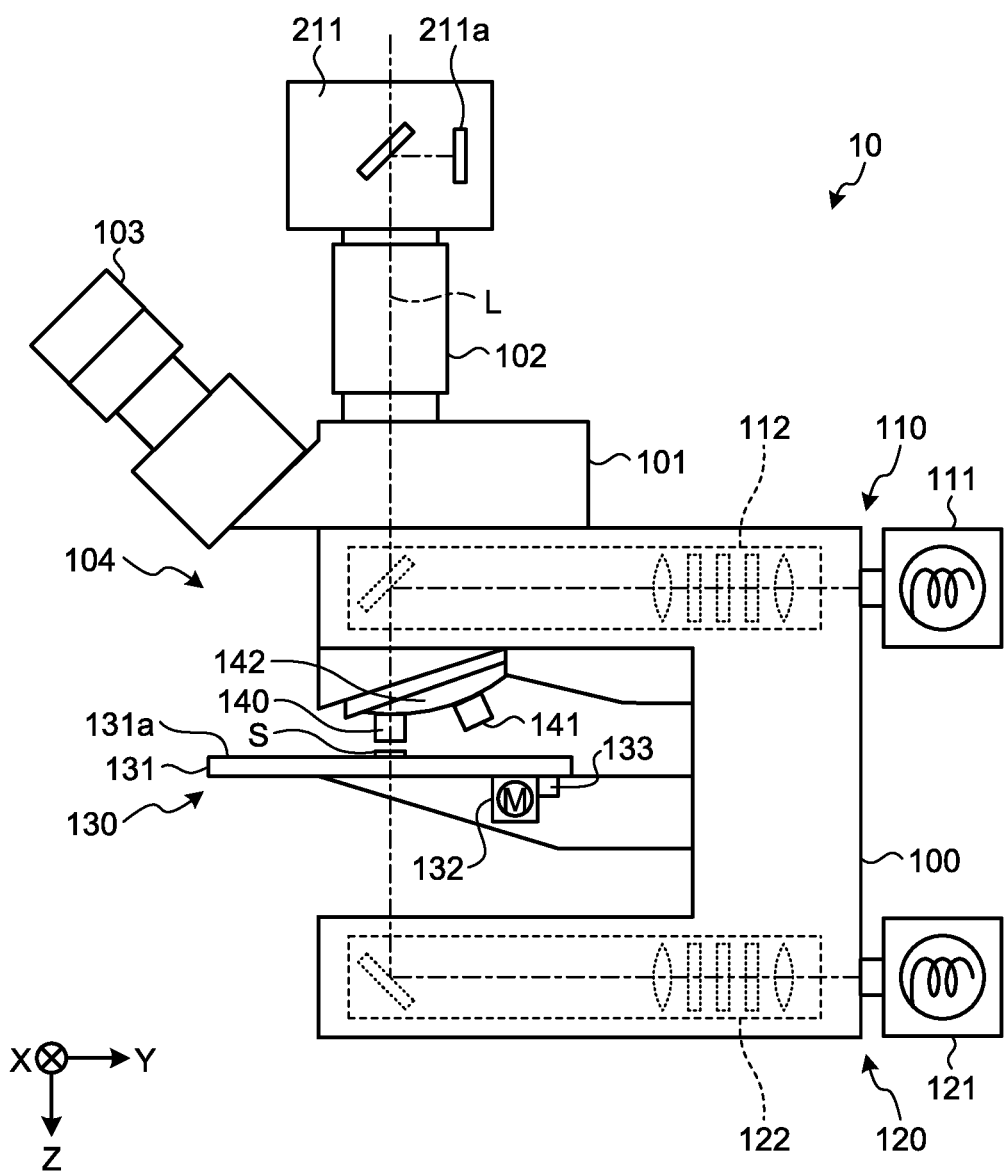
FIG. 2 is a schematic diagram illustrating an exemplary configuration of a microscope apparatus illustrated in FIG. 1.

FIG. 2 is a schematic diagram illustrating an exemplary configuration of the microscope apparatus 10. As illustrated in FIG. 2, the microscope apparatus 10 includes a substantially C-shaped arm 100, a lens barrel 102 and an eyepiece unit 103 supported on the arm 100 via a trinocular tube unit 101, an epi-illumination unit 110 and a transmitted-light illumination unit 120 provided on the arm 100, an electromotive stage unit 130 including a stage 131 on which an object S is placed, and an objective lens 140 that is provided on one end side of the lens barrel 102 so as to face the stage 131 via the trinocular tube unit 101 and forms an image of observation light from the object S. The objective lens 140, the lens barrel 102 connected via the trinocular tube unit 101, and an imaging unit 211 (described later) provided on the other end side of the lens barrel 102 constitute an observation optical system (imaging optical system) 104.

The trinocular tube unit 101 branches the observation light incident from the objective lens 140 in the direction of the eyepiece unit 103 for a user to directly observe the object S and in the direction of the imaging unit 211 described later.

The epi-illumination unit 110 includes a light source for epi-illumination 111 and an epi-illumination optical system 112, and irradiates the object S with epi-illumination light. The epi-illumination optical system 112 includes various optical members, specifically, a filter unit, a shutter, a field stop, an aperture diaphragm, and the like. These optical members collect the illumination light emitted from the light source for epi-illumination 111 and guide the illumination light toward an optical axis L of the observation optical system 104.

The transmitted-light illumination unit 120 includes a light source for transmitted-light illumination 121 and a transmitted-light illumination optical system 122, and irradiates the object S with transmitted illumination light. The transmitted-light illumination optical system 122 includes various optical members, specifically, a filter unit, a shutter, a field stop, an aperture diaphragm, and the like. These optical members collect the illumination light emitted from the light source for transmitted-light illumination 121 and guide the illumination light toward the optical axis L.

Either of these epi-illumination unit 110 and transmitted-light illumination unit 120 is selected and used according to a microscopic examination method. Note that only one of the epi-illumination unit 110 and the transmitted-light illumination unit 120 may be provided in the microscope apparatus 10.

The electromotive stage unit 130 includes the stage 131, a stage drive unit 132 that moves the stage 131, and a position detection unit 133. The stage drive unit 132 includes, for example, a motor. An object placement surface 131a of the stage 131 is provided so as to be orthogonal to the optical axis of the objective lens 140. In the following description, the object placement surface 131a is an XY plane, and a normal direction of the XY plane, that is, a direction parallel to the optical axis is a Z direction. In the Z direction, a downward direction in the figure, that is, a direction away from the objective lens 140 is a plus direction.

By moving the stage 131 within the XY plane, a position of a field of view of the objective lens 140 may be shifted. Furthermore, by moving the stage 131 in the Z direction, it is possible to shift a focal plane of the objective lens 140 along the optical axis L. That is, the electromotive stage unit 130 is a shift unit that shifts the focal plane and the position of the field of view by moving the stage 131 under the control of an imaging control unit 22 described later.

In FIG. 2, when the focal plane and the position of the field of view are shifted, the position of the observation optical system 104 including the members from the lens barrel 102 to the objective lens 140 is fixed and the stage 131 is moved. However, the position of the stage 131 may be fixed and the observation optical system 104 may be moved. Alternatively, both the stage 131 and the observation optical system 104 may be moved in opposite directions to each other. That is, as long as the observation optical system 104 and the object S may move relative to each other, any configuration may be adopted. Furthermore, the focal plane may be shifted by moving the observation optical system 104 in the Z direction and the position of a field of view V may be shifted by moving the stage 131 in the XY plane.

The position detection unit 133 includes, for example, an encoder that detects the rotation amount of the stage drive unit 132 that includes a motor. The position detection unit 133 detects the position of the stage 131 and outputs a detection signal. Note that instead of the stage drive unit 132 and the position detection unit 133, a pulse generating unit and a stepping motor that generate pulses according to the control of the imaging control unit 22 described later may be provided.

The objective lens 140 is attached to a revolver 142 capable of holding a plurality of objective lenses (for example, objective lenses 140 and 141) having different magnifications. By rotating the revolver 142 and changing the objective lenses 140 and 141 opposed to the stage 131, the imaging magnification may be changed. Note that FIG. 2 illustrates a state in which the objective lens 140 faces the stage 131.

Referring again to FIG. 1, the imaging apparatus 20 includes an image acquisition unit 21 that acquires an image by capturing an object image generated by the observation optical system 104 of the microscope apparatus 10, the imaging control unit 22 that controls the imaging operation of the image acquisition unit 21, a control unit 23 that controls various operations at the imaging apparatus 20 and processes the image acquired by the image acquisition unit 21, a storage unit 24 that stores various kinds of information such as image data of the image acquired by the image acquisition unit 21 and control programs, an input unit 25 that inputs instructions and information to the imaging apparatus 20, and an output unit 26 that outputs images based on the image data stored in the storage unit 24 and other various kinds of information to an external device.

The image acquisition unit 21 includes the imaging unit 211 and a memory 212. The imaging unit 211 is provided with, for example, an imaging element (imager) 211a including a CCD, a CMOS or the like, and is configured using a camera capable of imaging a color image having a pixel level (pixel value) in each band of red (R), green (G), and blue (B) in each pixel that the imaging element 211a includes. Alternatively, the imaging unit 211 may be configured using a camera capable of capturing a monochrome image that outputs a luminance value Y as a pixel level (pixel value) in each pixel.

As illustrated in FIG. 2, the imaging unit 211 is provided at one end of the lens barrel 102 such that the optical axis L passes through the center of the light receiving surface of the imaging element 211a. The imaging unit 211 photoelectrically converts observation light incident on the light receiving surface through the observation optical system 104 including the members from the objective lens 140 to the lens barrel 102, thereby generating image data of an object image that has entered the field of view of the objective lens 140.

The memory 212 includes a recording device, for example, a semiconductor memory such as a flash memory, a RAM, and a ROM that may update recording. The memory 212 temporarily stores the image data generated by the imaging unit 211.

The imaging control unit 22 outputs a control signal to the microscope apparatus 10 during one exposure period of the imaging unit 211 to move the stage 131, thereby shifting the focal plane and the position of the field of view of the objective lens 140. In this way, the imaging control unit 22 performs a control of acquiring a multi-focus superimposed image including image information on a plurality of planes in the direction of the optical axis L of the observation optical system 104.

The control unit 23 includes, for example, hardware such as a CPU, and reads a program stored in the storage unit 24, thereby collectively controlling the operations of the imaging apparatus 20 and the entire microscopy system 1 based on various parameters stored in the storage unit 24, information input from the input unit 25, and the like. Furthermore, the control unit 23 subjects image data input from the image acquisition unit 21 to predetermined image processing, thereby executing processing of generating an all-in-focus image.

Specifically, the control unit 23 includes a shift amount acquisition processing unit 231 that acquires a shift amount by which the position of the field of view of the observation optical system 104 is shifted when a multi-focus superimposed image is acquired, and an all-in-focus image generation unit 232 that generates an all-in-focus image by restoring the multi-focus superimposed image using a point spread function representing blur of the image.

The storage unit 24 includes a recording device, for example, a semiconductor memory such as a flash memory, a RAM, and a ROM that may update recording, a recording medium, which is built-in or connected via a data communication terminal, such as a hard disk, an MO, a CD-R, and a DVD-R, and a writing/reading apparatus that writes information on the recording medium and reads the information recorded on the recording medium. The storage unit 24 includes a parameter storage unit 241 that stores parameters used for calculation in the control unit 23, and a program storage unit 242 that stores various programs. Among the components, the parameter storage unit 241 stores parameters such as a shift amount by which the position of the field of view is shifted when a multi-focus superimposed image is acquired. Furthermore, the program storage unit 242 stores a control program for causing the imaging apparatus 20 to execute a predetermined operation, an image processing program, and the like.

The input unit 25 includes an input device such as a keyboard, various buttons, and various switches, and a pointing device such as a mouse and a touch panel, and inputs, to the control unit 23, a signal according to an operation performed on these devices.

The output unit 26 is an external interface that outputs, to an external device such as the display apparatus 30, an image based on image data acquired by the image acquisition unit 21, an all-in-focus image generated by the control unit 23, and other various kinds of information, and causes the external device to display these images and the other various kinds of information in a predetermined format.

Such an imaging apparatus 20 may be configured by combining a general-purpose digital camera with a general-purpose apparatus such as a personal computer and a workstation, via an external interface.

The display apparatus 30 includes, for example, an LCD, an EL display, or a CRT display, and displays an image output from the output unit 26 and related information. Note that in the first embodiment, the display apparatus 30 is provided outside the imaging apparatus 20. However, the display apparatus 30 may be provided inside the imaging apparatus 20.

Figure 3:
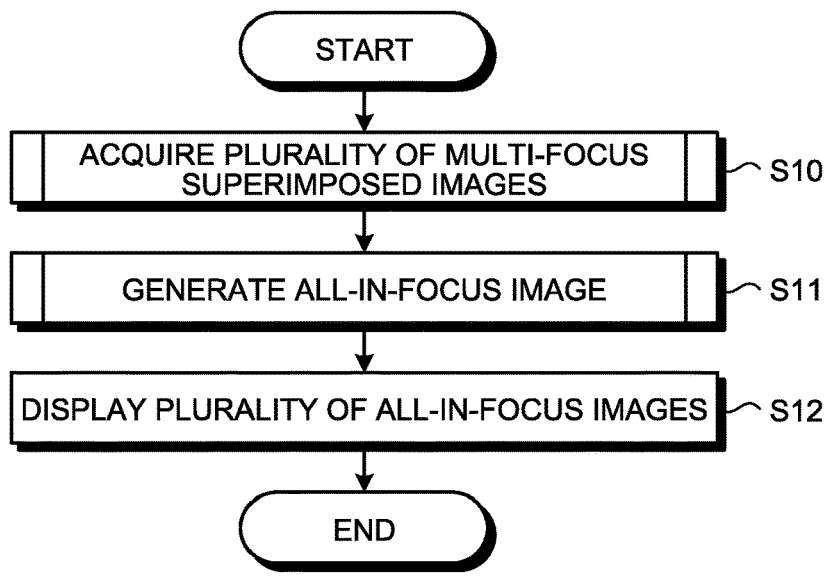
FIG. 3 is a flowchart illustrating an operation of the microscopy system illustrated in FIG. 1.

Next, the operation of the microscopy system 1 will be described. FIG. 3 is a flowchart illustrating the operation of the microscopy system 1.

Figure 4A:
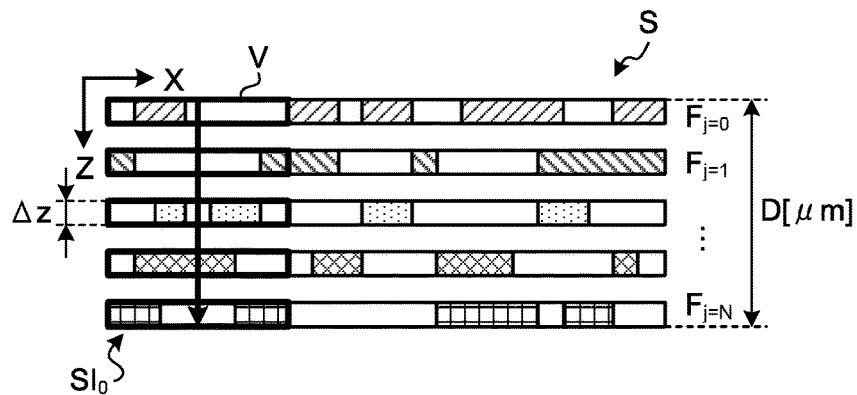
FIGS. 4A and 4B are schematic diagrams for describing processing of acquiring a plurality of multi-focus superimposed images.
Figure 4B:
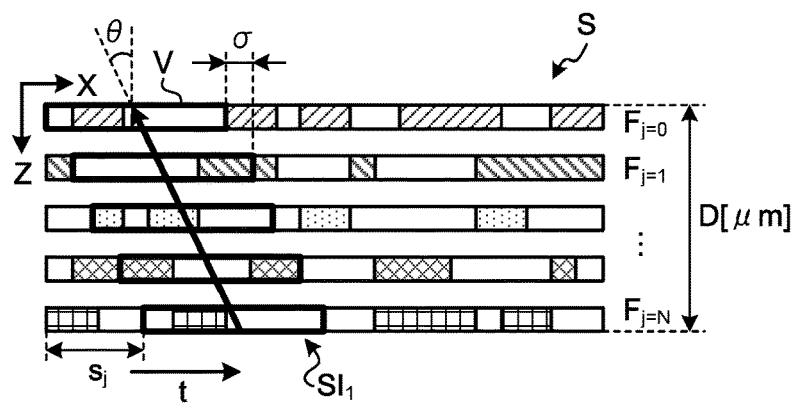

First, in step S10, the image acquisition unit 21 acquires a plurality of multi-focus superimposed images. FIGS. 4A and 4B are schematic diagrams for describing processing of acquiring the plurality of multi-focus superimposed images. In the following description, as illustrated in FIGS. 4A and 4B, a case where a range of a thickness D (μm) in the object S is imaged in a superimposed manner will be described. This range of the thickness D is called a superimposed imaging range. In FIGS. 4A and 4B, the superimposed imaging range is illustrated while being divided into a plurality of slices $F_{j=0 \; to \; N}$. In the first embodiment, a thickness $\Delta z$ of each slice $F_j$ corresponds to a depth of field of the observation optical system 104. Furthermore, an area enclosed by bold lines in each slice $F_j$ is the field of view V of the observation optical system 104 to be imaged. An arrow illustrated while being superimposed on the field of view V indicates a direction of shifting the focal plane and the position of the field of view.

As illustrated in FIG. 4A, it is assumed that when the processing of step S10 starts, the focal plane of the observation optical system 104 is set to the slice $F_{j=0}$ which is the Z position desired by the user, and the field of view V is set to the XY position desired by the user. This positioning may be performed manually by the user or may be performed by automatic control.

Figure 5:
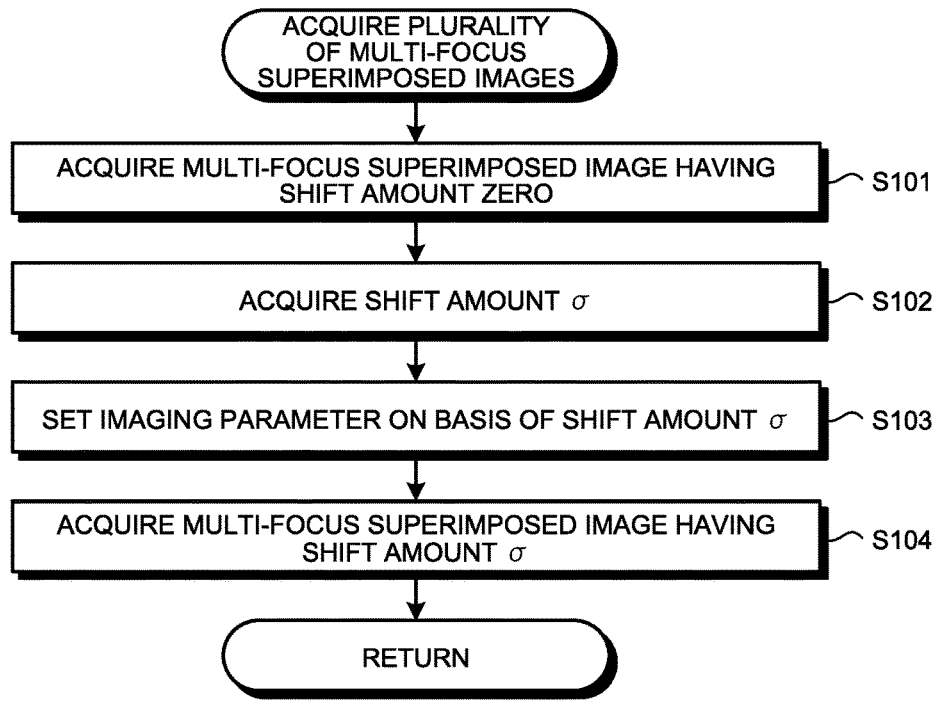
FIG. 5 is a flowchart illustrating details of the processing of acquiring a plurality of multi-focus superimposed images.

FIG. 5 is a flowchart illustrating details of the processing of acquiring a plurality of multi-focus superimposed images. First, in step S101, the image acquisition unit 21 acquires a multi-focus superimposed image having a shift amount zero. Specifically, as illustrated in FIG. 4A, under the control of the imaging control unit 22, exposure in the imaging unit 211 is started and the focal plane of the observation optical system 104 is moved in the +Z direction by the thickness D during one exposure period. As a result, a multi-focus superimposed image $SI_0$ in which images in the field of view V at the same X position in slices $F_{j=0}$ to $F_{j=N}$ are superimposed is acquired.

In subsequent step S102, the shift amount acquisition processing unit 231 acquires a shift amount by which the position of the field of view V is shifted when a multi-focus superimposed image is acquired. This shift amount may be a preset amount or may be acquired based on information input from the input unit 25 according to a user operation.

As illustrated in FIG. 4B, when a shift amount of the position of the field of view V between adjacent slices $F_j$ and $F_{j+1}$ is σ, a shift amount $s_j$ of the position of the field of view V in each slice $F_j$ with respect to the position of the field of view V in the slice $F_{j=0}$ at the uppermost surface is given by the following formula (1).

$$s_j = \sigma \times j \quad (1)$$

Furthermore, when a shift amount σ is determined according to a user operation, as illustrated in FIG. 4B, an angle θ formed when the user's eye line is tilted with respect to the direction directly above the object S is preferably input. In this case, if a pixel pitch of the imaging unit 211 is p (μm/pixel), the shift amount σ (pixel) is given by the following formula (2).

$$\sigma = (Z/\tan\theta)/p \quad (2)$$

In formula (2), a distance Z may be approximated by a distance from the objective lens 140 to each depth in the object S.

In subsequent step S103, the imaging control unit 22 sets imaging parameters based on the shift amount σ acquired in step S102. Specifically, the imaging control unit 22 first calculates a movement distance t=σ×N by which the field of view is moved to the next imaging start position. This movement distance corresponds to moving the stage 131 along the X direction by the distance σ×N×p/M using a pixel pitch p of the imaging unit 211 and an observation magnification M times in the microscope apparatus 10.

Furthermore, the imaging control unit 22 calculates, as an imaging parameter, a shift speed $v_1$ at which the field of view V is shifted along the X direction during one exposure period. The shift speed $v_1$ is given by the following formula (3), using an exposure period $T_1$ of one time, the pixel pitch p of the imaging unit 211, the number N of the depth of field Δz included in the thickness D of the superimposed imaging range, and the observation magnification M times.

$$v_1 = (p \times \sigma/M)/(T_1/N) \quad (3)$$

In subsequent step S104, under the control of the imaging control unit 22 based on the imaging parameters set in step S103, the image acquisition unit 21 images the object S while shifting the focal plane and the position of the field of view V of the observation optical system 104 during one exposure period by the imaging unit 211. In this way, the image acquisition unit 21 acquires a multi-focus superimposed image having the shift amount σ.

Specifically, as illustrated in FIG. 4B, the field of view V is first shifted in the X direction by the distance t. This position is the imaging start position of the next multi-focus superimposed image. Then, exposure is started in the imaging unit 211, the field of view V is shifted in the −X direction at the speed $v_1$ during one exposure period, and the focal plane is shifted in the −Z direction at a speed $D/T_1$. As a result, a multi-focus superimposed image $SI_1$ on which an image in the field of view V in each of slices $F_{j=0}$ to $F_{j=N}$ is superimposed is acquired. Thereafter, the operation of the microscopy system 1 returns to the main routine.

Herein, the direction of shifting the focal plane and the position of the field of view V is not limited to the direction of the arrow illustrated in FIGS. 4A and 4B. For example, when a multi-focus superimposed image $SI_0$ illustrated in FIG. 4A is acquired, the focal plane may be shifted in the −Z direction (from the slice $F_{j=N}$ to the slice $F_{j=0}$). Alternatively, when a multi-focus superimposed image $SI_1$ illustrated in FIG. 4B is acquired, the field of view V may be shifted in the +X direction while the focal plane is shifted in the +Z direction. Preferably, the order of acquiring a plurality of multi-focus superimposed images $SI_0$ and $SI_1$ and the shift direction of the focal plane and the position of the field of view V are preferably set such that the number of movements and the amount of movement of the stage 131 are as small as possible.

In step S11 subsequent to step S10, the all-in-focus image generation unit 232 generates an all-in-focus image based on the plurality of multi-focus superimposed images acquired in step S10.

Figure 6:
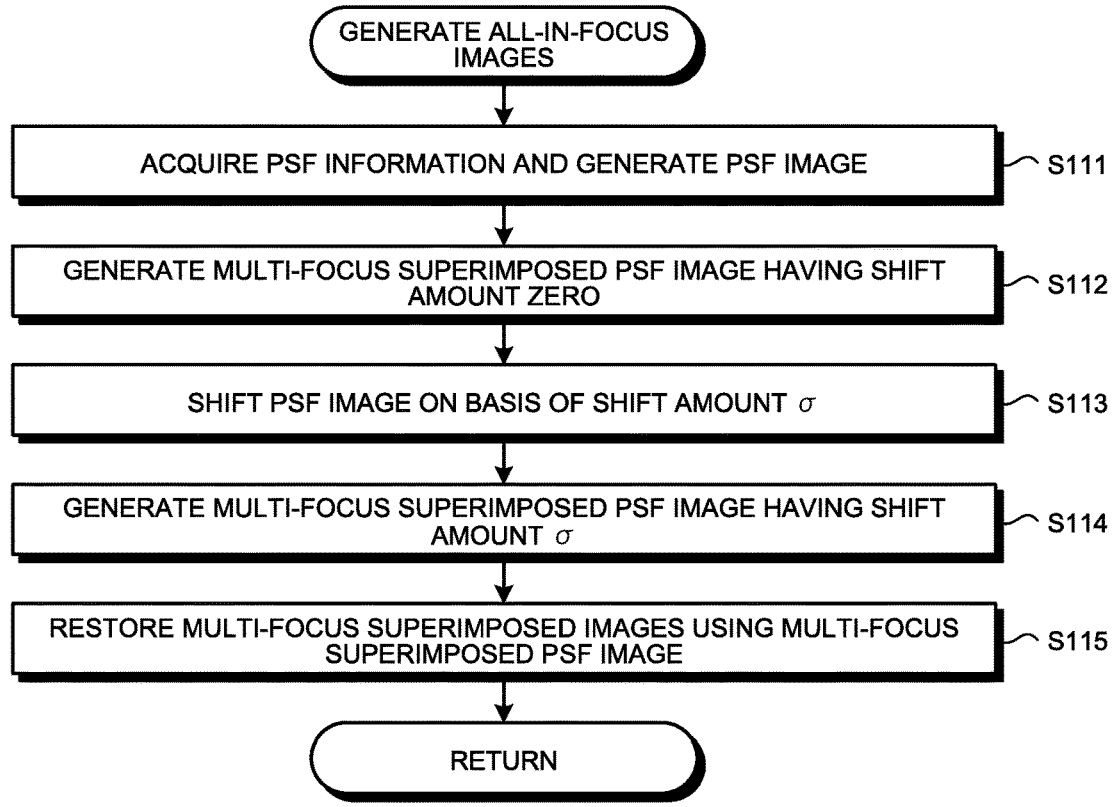
FIG. 6 is a flowchart illustrating details of processing of generating a plurality of all-in-focus images.

FIG. 6 is a flowchart illustrating details of processing of generating the all-in-focus image. In step S111, the all-in-focus image generation unit 232 acquires point spread function (PSF) information representing image blur in an image of each slice $F_j$, and generates a PSF image based on the PSF information. The point spread function is stored in advance in the parameter storage unit 241 in association with imaging conditions such as the magnification of the objective lens 140 in the microscope apparatus 10 and the slice $F_j$. The all-in-focus image generation unit 232 reads the point spread function according to the slice $F_j$ from the parameter storage unit 241 based on imaging conditions such as the magnification of the objective lens 140, and calculates a pixel value corresponding to each pixel position in an image of the field of view V, based on the point spread function. In this way, the all-in-focus image generation unit 232 generates a PSF image for each slice $F_j$.

In subsequent step S112, the all-in-focus image generation unit 232 generates a multi-focus superposed PSF image $PI_0$ having a shift amount zero corresponding to the multi-focus superimposed image $SI_0$. Specifically, by averaging the pixel values of pixels the positions of which correspond to each other among the plurality of PSF images corresponding to slices $F_{j=0 \, to \, N}$, the plurality of PSF images being generated in step S111, a pixel value of each pixel in the multi-focus superposed PSF image $PI_0$ is calculated.

In subsequent step S113, the all-in-focus image generation unit 232 acquires the shift amount σ used when generating the multi-focus superimposed image $SI_1$, and shifts the PSF image corresponding to each slice $F_j$ based on the shift amount σ. That is, as is the case with when the multi-focus superimposed image $SI_1$ is generated, the PSF image corresponding to another slice $F_j$ is shifted by the shift amount $s_j = \sigma \times j$ with respect to the PSF image corresponding to the slice $F_{j=0}$ at the uppermost surface.

In subsequent step S114, the all-in-focus image generation unit 232 generates a multi-focus superposed PSF image $PI_1$ having the shift amount σ, using the plurality of PSF images after the shift processing in step S113. Specifically, by averaging the pixel values of pixels the positions of which correspond to each other among the plurality of PSF images after the shift processing, a pixel value of each pixel in the multi-focus superposed PSF image $PI_1$ is calculated.

In step S115, the all-in-focus image generation unit 232 restores the plurality of multi-focus superimposed images $SI_0$ and $SI_1$ generated in step S10, using the multi-focus superposed PSF images $PI_0$ and $PI_1$ respectively. As a result, an all-in-focus image $AI_0$ is generated from the multi-focus superimposed image $SI_0$, and an all-in-focus image $AI_1$ is generated from the multi-focus superimposed image $SI_1$. Thereafter, the operation of the control unit 23 returns to the main routine.

In step S12 subsequent to step S11, the imaging apparatus 20 outputs the image data of the plurality of all-in-focus images $AI_0$ and $AI_1$ generated in step S11 to the display apparatus 30, and causes the display apparatus 30 to display the all-in-focus images $AI_0$ and $AI_1$. A method of displaying the all-in-focus images $AI_0$ and $AI_1$ is not particularly limited. For example, the all-in-focus images $AI_0$ and $AI_1$ may be displayed side by side or the all-in-focus images $AI_0$ and $AI_1$ may be alternately displayed in the same area. When the all-in-focus images $AI_0$ and $AI_1$ are alternately displayed in the same area, the all-in-focus images $AI_0$ and $AI_1$ may be automatically switched at predetermined intervals or may be manually switched by the user using the input unit 25.

Figure 7:
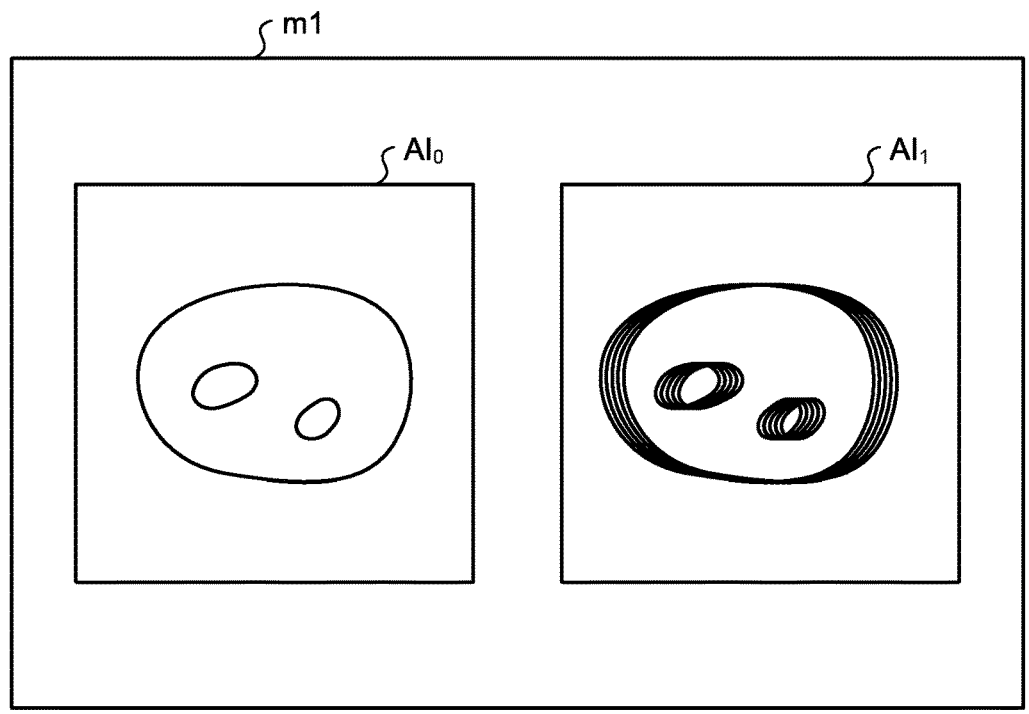
FIG. 7 is a schematic diagram illustrating an example in which two all-in-focus images are displayed side by side in a display apparatus illustrated in FIG. 1.

FIG. 7 is a schematic diagram illustrating a display example of an all-in-focus image in the display apparatus 30. On a screen m1 illustrated in FIG. 7, two all-in-focus images $AI_0$ and $AI_1$ are displayed side by side. Thereafter, the operation of the microscopy system 1 ends.

As described above, in the first embodiment of the present disclosure, the multi-focus superimposed image is acquired by performing imaging while the focal plane and the position of the field of view are shifted during one exposure period, and the multi-focus superimposed image is restored. In this way, the all-in-focus image is generated. At this time, the all-in-focus image is generated and displayed under conditions in which the shift amounts of the position of the field of view are different. As a result, it is possible to reproduce a state of virtually viewing the object S from a plurality of viewpoints. For example, in the case of FIGS. 4A and 4B, by setting the shift amount to zero, it is possible to reproduce a state of viewing the object S from directly above. By setting the shift amount to σ, it is possible to reproduce a state of viewing the object S from the upper left. Therefore, by referring to these all-in-focus images, the user may visually and intuitively grasp a position of a structure in the Z direction in the object S, an anteroposterior relationship between structures, an overlapping state of the structures, and the like.

Furthermore, according to the first embodiment, the multi-focus superimposed image is acquired by performing imaging while the focal plane is moved during one exposure period. Therefore, it is possible to perform imaging in a short time and significantly suppress a data amount and a calculation amount in the image processing, as compared with the case where the multi-focus superimposed image is acquired by acquiring Z stack images by performing imaging a plurality of times and then averaging the Z stack images.

In the first embodiment, in order to promote understanding, the case where the field of view V of the observation optical system 104 is shifted only in the X direction has been described. However, similar processing may be performed in the Y direction. In this case, it is possible to generate an all-in-focus image as in the case where the virtual viewpoint with respect to the object S is moved along the Y direction. Furthermore, by shifting the field of view V of the observation optical system 104 in two directions, that is, the X direction and the Y direction, it is also possible to generate an all-in-focus image as in the case where a virtual viewpoint with respect to the object S is moved in the horizontal plane.

First Modification

Figure 8:
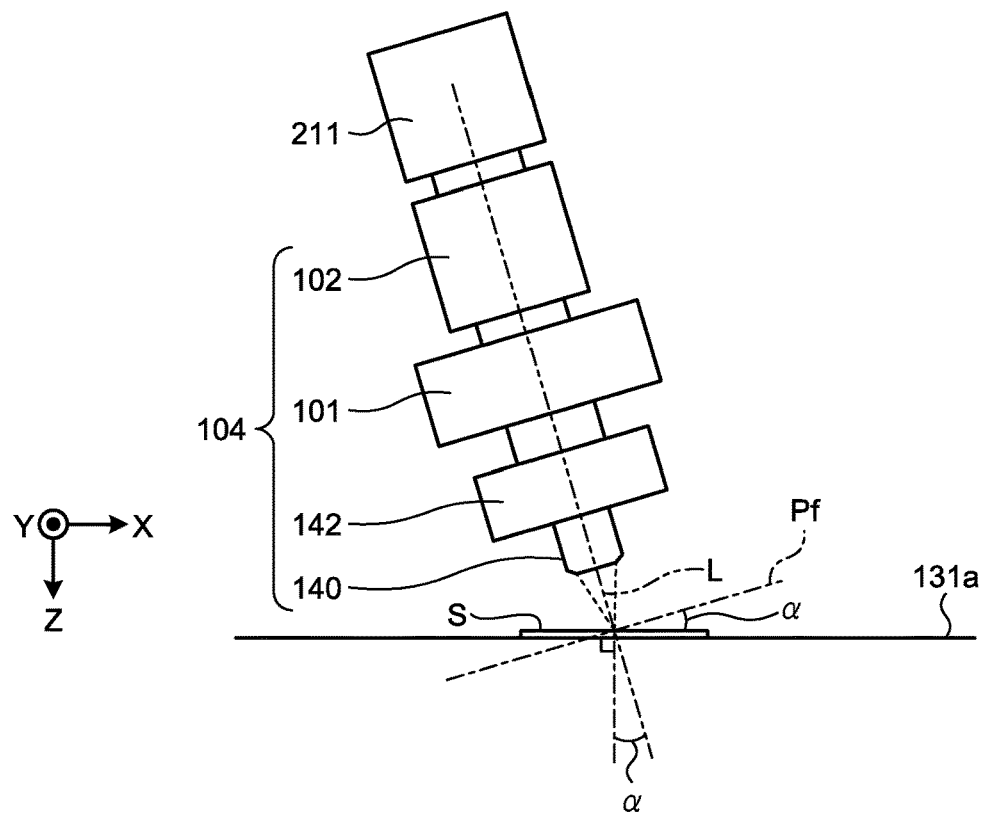
FIG. 8 is a schematic diagram for describing a method of acquiring a multi-focus superimposed image in a first modification of the first embodiment of the present disclosure.
Figure 9:
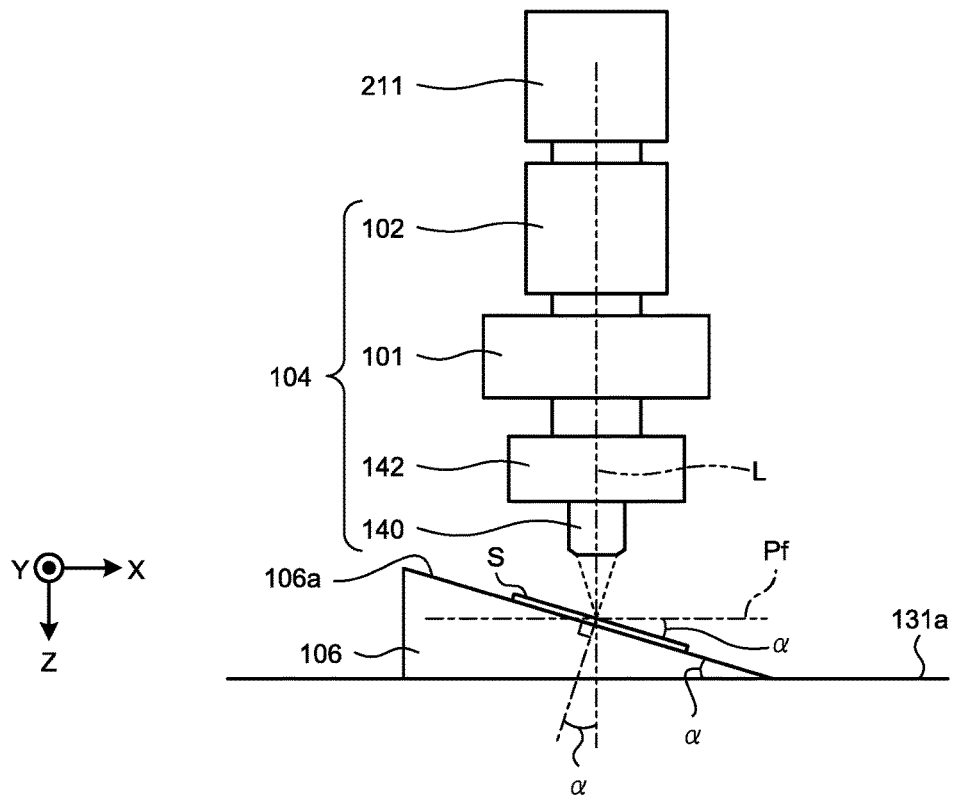
FIG. 9 is a schematic diagram for describing the method of acquiring a multi-focus superimposed image in the first modification of the first embodiment of the present disclosure.

Next, a first modification of the first embodiment of the present disclosure will be described. FIGS. 8 and 9 are schematic diagrams for describing a method of acquiring a multi-focus superimposed image in the first modification.

In the first embodiment, the optical axis of the observation optical system 104 is orthogonal to the stage 131. When the multi-focus superimposed image $SI_1$ having the shift amount σ is acquired, imaging is performed while the stage 131 is moved in the Z direction and the X direction. However, imaging may be performed by tilting an optical axis of an observation optical system 104 with respect to a stage 131 in advance.

For example, as illustrated in FIG. 8, an object placement surface 131a of the stage 131 is set horizontally and an optical axis L of the observation optical system 104 is tilted by an angle α with respect to a normal line of the object placement surface 131a. As a result, a focal plane Pf of an imaging unit 211 is tilted at the angle α with respect to the object placement surface 131a. In this case, by moving the observation optical system 104 along the optical axis L in a direction approaching the object placement surface 131a, the focal plane Pf moves in the +Z direction with respect to an object S, and a field of view shifts in the +X direction. That is, control for two-dimensionally moving the observation optical system 104 becomes unnecessary, and drive control for the observation optical system 104 may be simplified.

Alternatively, as illustrated in FIG. 9, the object placement surface 131a of the stage 131 is set horizontally and the optical axis L of the observation optical system 104 is set orthogonal to the object placement surface 131a. Then, a pedestal 106 having a sloped surface at an angle α with respect to the bottom surface is installed on the stage 131. By placing the object S on a slope 106a of the pedestal 106, the focal plane Pf of the imaging unit 211 is tilted at the angle α with respect to the slope 106a. In this case, by moving the stage 131 in the −Z direction or moving the observation optical system 104 in the +Z direction, the focal plane Pf with respect to the object S moves in the +Z direction and the field of view shifts in the +X direction. In this case, control for two-dimensionally moving the stage 131 or the observation optical system 104 becomes unnecessary, and drive control for the stage 131 or the observation optical system 104 may be simplified.

Thus, when the focal plane Pf is tilted with respect to the object S, setting of various imaging parameters is performed as follows. If a shift amount between adjacent slices in the multi-focus superimposed image $SI_1$ is σ (pixel), a pixel pitch of the imaging unit 211 is p (μm/pixel), the number of a depth of field Δz included in a superimposed imaging range having a thickness D is N (N=D/Δz), and an observation magnification is M times, the angle α is given by the following formula (4).

$$\alpha = \tan^{-1}\{(p \times \sigma \times N/M)/D\} \quad (4)$$

A shift amount acquisition processing unit 231 calculates the angle α based on the shift amount σ and outputs the angle α. An imaging control unit 22 performs control to tilt the focal plane Pf of the observation optical system 104 with respect to the object placement surface 131a by the angle α, based on the angle α, as illustrated in FIG. 8.

Alternatively, when a pedestal 106 is installed, as illustrated in FIG. 9, the user inputs the angle α of the slope 106a with respect to the object placement surface 131a using the input unit 25. In this case, the shift amount acquisition processing unit 231 calculates the shift amount σ corresponding to the angle α from formula (4), and the imaging control unit 22 calculates various control parameters based on this shift amount σ.

Second Modification

Next, a second modification of the first embodiment of the present disclosure will be described. In the first embodiment, a multi-focus superimposed image is acquired by continuously shifting the focal plane and the position of the field of view V while the shutter is kept open during one exposure period of the imaging unit 211. However, a shutter that blocks the incidence of light on an imaging unit 211 may be opened and closed at a predetermined cycle during one exposure period, and a focal plane and a position of a field of view V may be shifted in stages while the shutter is closed.

The number of times the shutter is opened and closed during one exposure period, that is, the number of times an object S is exposed to the imaging unit 211, or the number of times the focal plane and the position of the field of view are shifted, and a position shift amount of the focal plane and the field of view V per one time are appropriately set according to one exposure period, a shutter speed, and the like in the imaging unit 211.

For example, when the multi-focus superimposed image $SI_0$ having a shift amount zero as illustrated in FIG. 4A is acquired, the focal plane is moved by a predetermined superimposed imaging range, specifically, by several multiples of a depth of field ($k \times \Delta z$, where k is a natural number) while the shutter is opened. Furthermore, when the multi-focus superimposed image $SI_1$ having a shift amount σ illustrated in FIG. 4B is acquired, the focal plane is moved by a predetermined superimposed imaging range, specifically, by several multiples of the depth of field ($k \times \Delta z$) and the position of the field of view V is shifted by several multiples of the shift amount σ ($k \times \sigma$) while the shutter is opened.

In this case, in step S111 of FIG. 6, a PSF image corresponding to a plurality of slices from the opening of the shutter to the closing of the shutter is generated. Furthermore, in step S113 of FIG. 6, the PSF image is shifted in accordance with the shift amount of the position of the field of view V according to the opening and closing cycle of the shutter. The processing in S112, S114, and S115 is similar to that in the first embodiment.

Third Modification

Next, a third modification of the first embodiment of the present disclosure will be described. In the first embodiment, two multi-focus superimposed images having shift amounts of zero and σ are acquired. However, a multi-focus superimposed image having a different shift amount may be further acquired.

Figure 10:
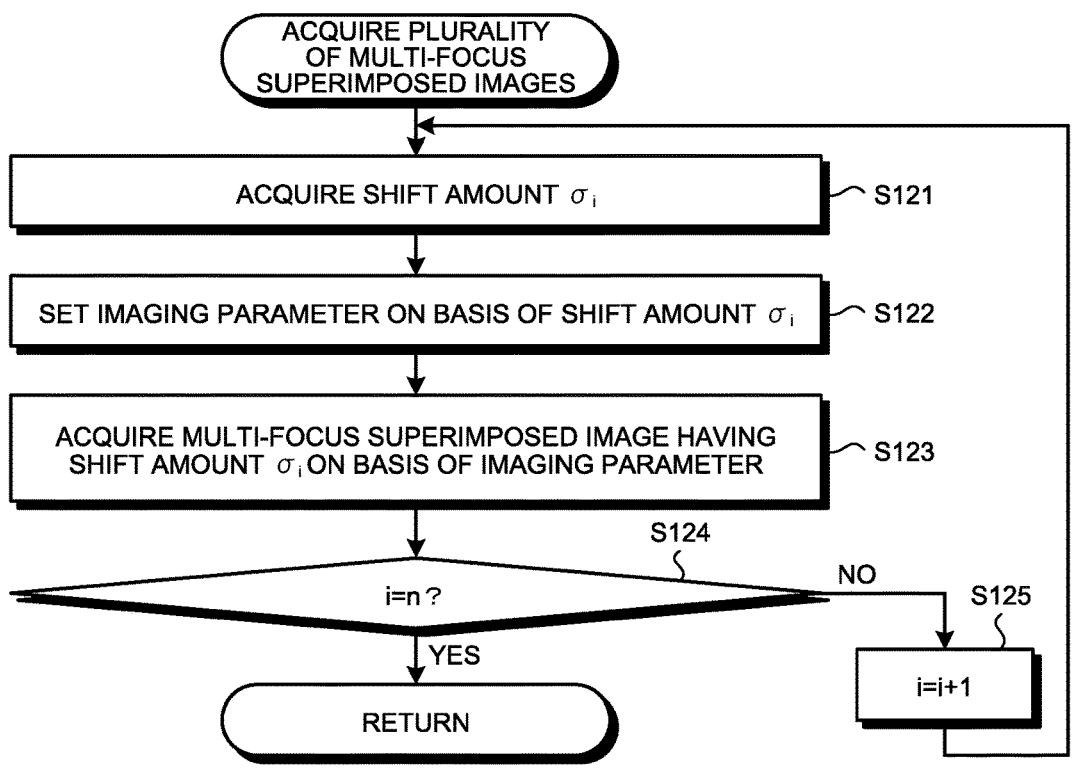
FIG. 10 is a flowchart illustrating details of processing of acquiring a plurality of multi-focus superimposed images in a third modification of the first embodiment of the present disclosure.
Figure 11A:
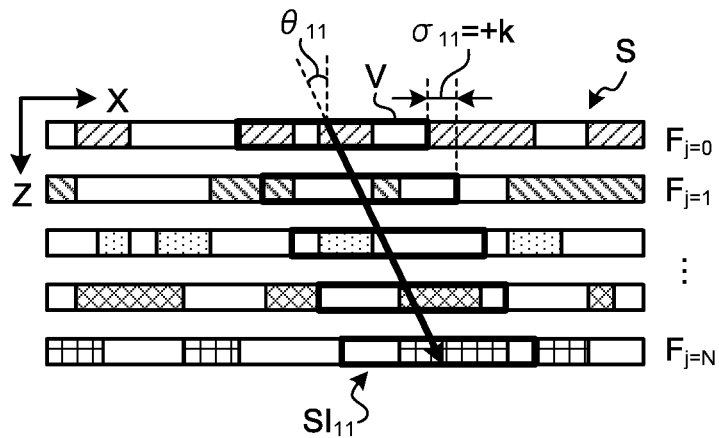
FIGS. 11A-11C are schematic diagrams for describing the processing of acquiring a plurality of multi-focus superimposed images in the third modification of the first embodiment of the present disclosure.
Figure 11B:
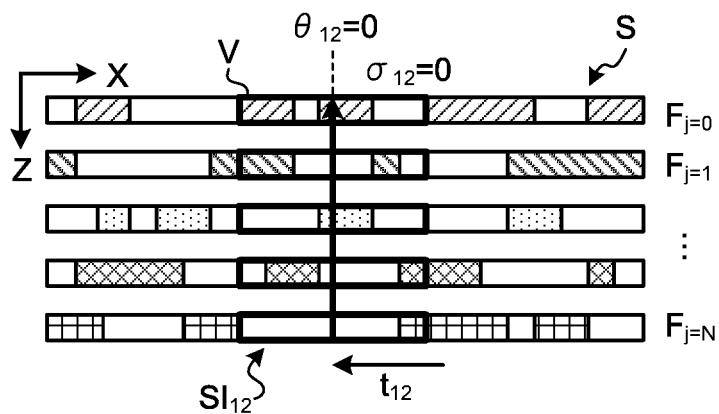
Figure 11C:
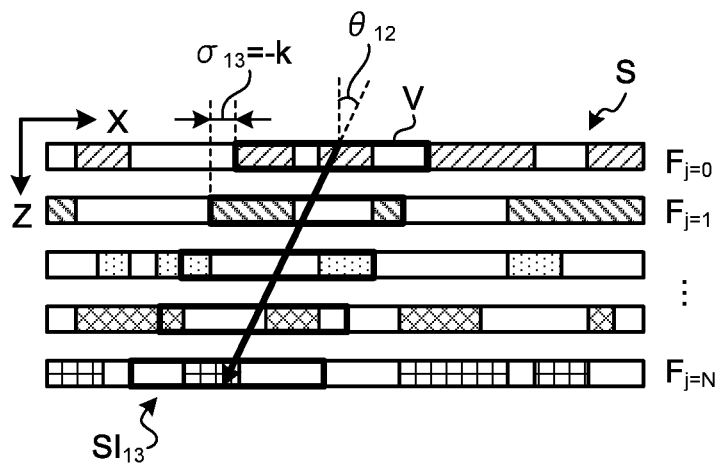

FIG. 10 is a flowchart illustrating details of processing of acquiring a plurality of multi-focus superimposed images in the present third modification. Furthermore, FIGS. 11A-11C are schematic diagrams for describing the processing of acquiring a plurality of multi-focus superimposed images in the third modification. In the third modification, when the reference sign of the shift amount is positive, when the focal plane is shifted in the +Z direction, the field of view V is shifted in the +X direction.

First, in step S121, a shift amount acquisition processing unit 231 acquires a shift amount $\sigma_i$ (i=11, 12, . . . , n) used when a plurality of multi-focus superimposed images is acquired. Herein, a subscript i is a variable representing the order of acquiring multi-focus superimposed images. FIGS. 11A-11C illustrate cases where three shift amounts $\sigma_i$ of $\sigma_{11}=+k$, $\sigma_{12}=0$, and $\sigma_{13}=-k$ are acquired.

These shift amounts $\sigma_i$ may be preset quantities or may be acquired based on information input from the input unit 25 according to user operation. In the latter case, it is preferable to cause the user to input the angle $\theta_i$ when the user's eye line is tilted with respect to the direction directly above the object S. A relationship between the angle $\theta_i$ and the shift amount $\sigma_i$ is given by the following formula (5), using a pixel pitch p of an imaging unit 211 and a distance Z (approximate value) from an objective lens 140 to each depth in the object S.

$$\sigma_i = (Z/\tan \theta_i)/p \quad (5)$$

In subsequent step S122, the imaging control unit 22 sets imaging parameters based on the shift amount $\sigma_i$. Specifically, first, the imaging control unit 22 calculates, as imaging parameters, an imaging start position and a movement distance to the imaging start position by which the field of view V is moved. Note that it is not necessary to calculate the movement distance of the field of view V at the time of the first imaging (i=11), and imaging may be started from the position of the current field of view V of the observation optical system 104.

Furthermore, the imaging control unit 22 calculates, as an imaging parameter, a shift speed at which the field of view V is shifted along the X direction during one exposure period of the imaging unit 211. A method of calculating the shift speed is similar to that in the first embodiment (refer to step S103 in FIG. 5).

In subsequent step S123, under the control of the imaging control unit 22 based on the imaging parameters set in step S122, the image acquisition unit 21 images the object S while shifting the focal plane of the observation optical system 104 and the field of view V during one exposure period of the imaging unit 211. In this way, the image acquisition unit 21 acquires a multi-focus superimposed image $SI_i$ having the shift amount $\sigma_i$. A method of acquiring the multi-focus superimposed image $SI_i$ is similar to that in the first embodiment (refer to step S104 in FIG. 5). Alternatively, as in the second modification, imaging may be performed in stages. As a result, a multi-focus superimposed image $SI_i$ in which images in the field of view V in the slices $F_{j=0}$ to $F_{j=N}$ are superimposed is acquired.

In subsequent step S124, the control unit 23 determines whether the variable i has reached a maximum value n. When the variable i has not reached the maximum value n (step S124: No), the control unit 23 increments the variable i (step S125). Thereafter, the operation of the control unit 23 returns to step S121. By repeating steps S121 to S123 in this way, a plurality of multi-focus superimposed images $SI_i$ having different shift amounts $\sigma_i$ is acquired.

Herein, by appropriately setting imaging parameters that control the order of acquiring the multi-focus superimposed images $SI_i$, the imaging start position, and the shift direction of the focal plane and the position of the field of view V, it is possible to suppress the movement amount of the stage 131 and shorten the total imaging time, thereby efficiently acquiring the multi-focus superimposed images $SI_i$.

Specifically, first, as illustrated in FIG. 11A, the position of the field of view V is shifted in the X direction at a pace of the shift amount k while the focal plane is shifted in the +Z direction during one exposure period. In this way, a multi-focus superimposed image $SI_{11}$ having the shift amount $\sigma_{11}$ is acquired. Subsequently, as illustrated in FIG. 11B, after the imaging start position is moved in the −X direction by the distance $t_{12}=\sigma_{11}\times N$, exposure is started, and the focal plane is shifted in the −Z direction. In this way, a multi-focus superimposed image $SI_{12}$ having the shift amount $\sigma_{12}=0$ of the position of the field of view V is acquired. Subsequently, as illustrated in FIG. 11C, exposure is started at an immediately preceding imaging end position, and the position of the field of view V is shifted in the −X direction at the pace of the shift amount k while the focal plane is shifted in the +Z direction. In this way, a multi-focus superimposed image $SI_{13}$ having the shift amount $\sigma_{13}$ is acquired.

On the other hand, when the variable i reaches the maximum value n in step S124 (step S124: Yes), the operation of the microscopy system 1 returns to the main routine.

The processing of generating an all-in-focus image based on a plurality of multi-focus superimposed images $SI_i$ generated in this way (refer to step S11 in FIG. 3, and FIG. 6) is generally similar to that in the first embodiment. In the processing, in steps S112 to S115 illustrated in FIG. 6, a multi-focus superposed PSF image is generated for each of the multi-focus superimposed images $SI_i$ using the shift amount $\sigma_i$ used when the multi-focus superimposed images $SI_i$ are generated. Using each of these multi-focus superimposed PSF images, the multi-focus superimposed image $SI_i$ is restored. As a result, a plurality of all-in-focus images having different shift amounts $\sigma_i$ is generated.

Furthermore, when a plurality of all-in-focus images is displayed (refer to step S12 in FIG. 3), the plurality of all-in-focus images may be displayed side by side or these all-in-focus images are sequentially switched and displayed in the same area. For example, the plurality of all-in-focus images acquired from the plurality of multi-focus superimposed images $SI_i$ illustrated in FIGS. 11A-11C may be repeatedly switched in order of the shift amount $\sigma_{11}=+k \rightarrow$ the shift amount $\sigma_{12}=0 \rightarrow$ the shift amount $\sigma_{13}=-k \rightarrow$ the shift amount $\sigma_{12}=0 \rightarrow$ the shift amount $\sigma_{11}=+k \rightarrow$ the shift amount $\sigma_{12}=0 \rightarrow \ldots$ As described above, according to the third modification of the first embodiment of the present disclosure, the plurality of all-in-focus images in which the direction of shifting the position of the field of view V is different is generated and displayed. Therefore, it is possible to reproduce a state of virtually viewing the object S from directly above ($\theta_{12}$), the upper left ($\theta_{11}$), and the upper right ($\theta_{12}$). Therefore, by referring to such an all-in-focus image, it becomes possible for the user to grasp in more detail an overlapping condition between structures in the Z direction in the object S and an anteroposterior relationship between the structures.

Fourth Modification

Next, a fourth modification of the first embodiment of the present disclosure will be described. In the third modification described above, the magnitude of the shift amount $\sigma_i$ of the position of the field of view V is the same between the two multi-focus superimposed images and $SI_{13}$. However, the shift amount $\sigma_i$ may be varied among a plurality of multi-focus superimposed images $SI_i$.

FIGS. 12A-12E are schematic diagrams for describing processing of acquiring a multi-focus superimposed image in the fourth modification. In multi-focus superimposed images $SI_{21}$ to $SI_{25}$ illustrated in FIGS. 12A-12E, the magnitudes of the shift amounts $\sigma_{21}$ to $\sigma_{25}$ increase in order of $\sigma_{21} < \sigma_{22} < \sigma_{23} < \sigma_{24} < \sigma_{25}$. By changing the magnitude of the shift amount $\sigma_i$ in this way, it is possible to reproduce a state of virtually observing the object S from various angles. The processing of acquiring these multi-focus superimposed images $SI_i$ is similar to that in the third modification (refer to FIG. 10).

Also in this case, by appropriately setting control parameters such as the order of acquiring the multi-focus superimposed images $SI_i$, the imaging start position of each multi-focus superimposed image $SI_i$, the shift direction of the focal plane and the position of the field of view V, it is possible to suppress the movement amount of the stage 131 and shorten the total imaging time, thereby efficiently acquiring the multi-focus superimposed image $SI_i$.

Figure 12A:
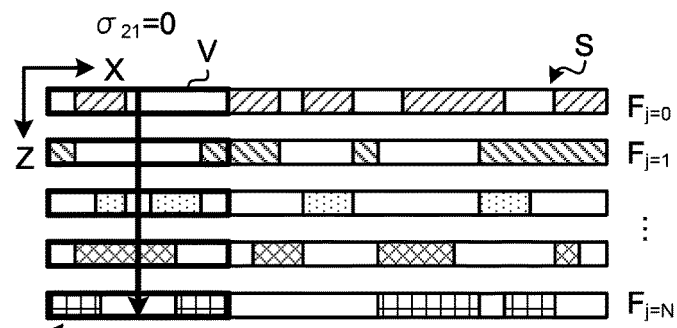
FIGS. 12A-12E are schematic diagrams for describing processing of acquiring a multi-focus superimposed image in a fourth modification of the first embodiment of the present disclosure.
Figure 12B:
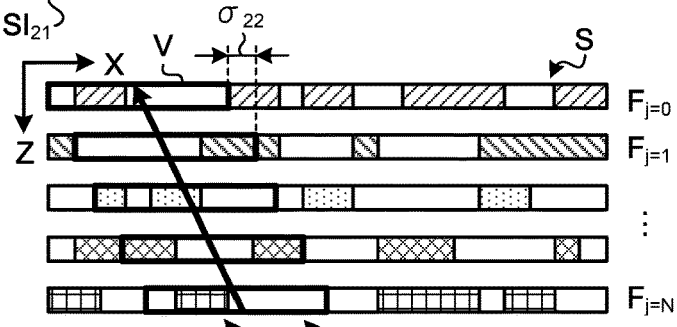
Figure 12C:
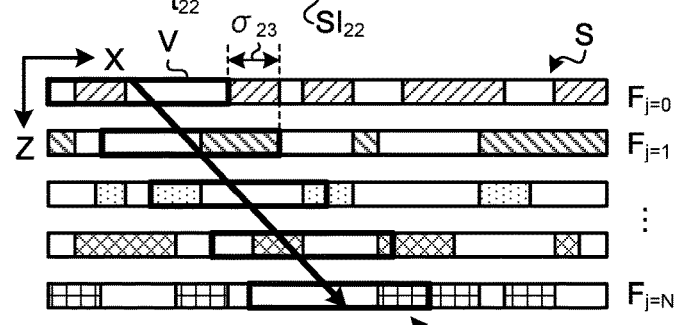
Figure 12D:
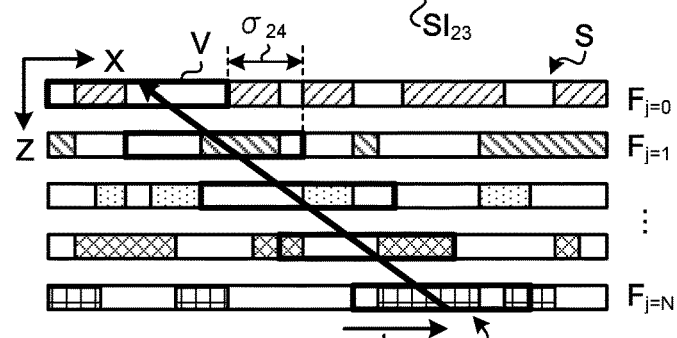
Figure 12E:
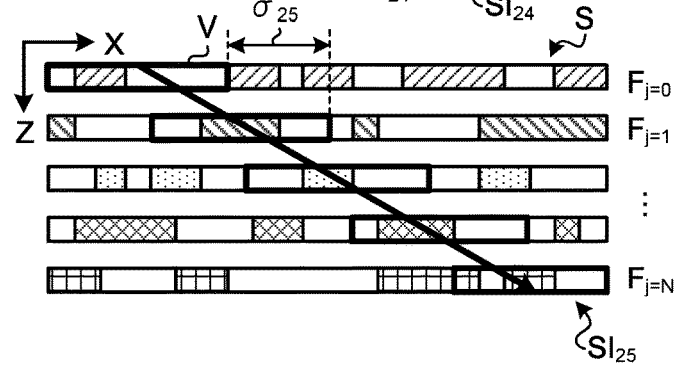

Specifically, first, as illustrated in FIG. 12A, by shifting the focal plane in the +Z direction during one exposure period, a multi-focus superimposed image $SI_{21}$ having a shift amount $\sigma_{21}=0$ is acquired. Subsequently, as illustrated in FIG. 12B, after the imaging start position is moved in the +X direction by the distance $t_{22}$ ($t_{22}=\sigma_{22}\times N$), exposure is started, and the focal plane is shifted in the −Z direction while the field of view V is shifted in the −X direction at a pace of the shift amount $\sigma_{22}$. In this way, the multi-focus superimposed image $SI_{22}$ is acquired. Subsequently, as illustrated in FIG. 12C, the exposure is started at the immediately preceding imaging end position, and the field of view V is shifted in the +X direction at a pace of the shift amount $\sigma_{23}$ while shifting the focal plane in the −Z direction. In this way, the multi-focus superimposed image $SI_{23}$ is acquired. Subsequently, as illustrated in FIG. 12D, after the imaging start position is moved in the +X direction by the distance $t_{24}$ ($t_{24}=\sigma_{24}\times N-\sigma_{23}\times N$), the exposure is started, and the field of view V is shifted in the −X direction at a pace of the shift amount $\sigma_{24}$ while the focal plane is shifted in the −Z direction. In this way, the multi-focus superimposed image $SI_{24}$ is acquired. Furthermore, as illustrated in FIG. 12E, the exposure is started at the immediately preceding imaging end position and the field of view V is shifted in the +X direction at a pace of the shift amount $\sigma_{25}$ while the focal plane is shifted in the +Z direction. In this way, the multi-focus superimposed image $SI_{25}$ is acquired.

The processing of generating a plurality of all-in-focus images based on these multi-focus superimposed images $SI_i$ and the processing of displaying a plurality of images are similar to those in the third modification.

As described above, according to the fourth modification of the first embodiment of the present disclosure, the magnitude of the shift amount $\sigma_i$ is changed among the plurality of multi-focus superimposed images $SI_i$. Therefore, it is possible to reproduce a state of virtually observing the object S from a plurality of directions in a wider range. Therefore, the user may intuitively and more realistically grasp a position of a structure in the Z direction in the object S, an overlapping state of structures and an anteroposterior relationship between the structures.

Second Embodiment

Figure 13:
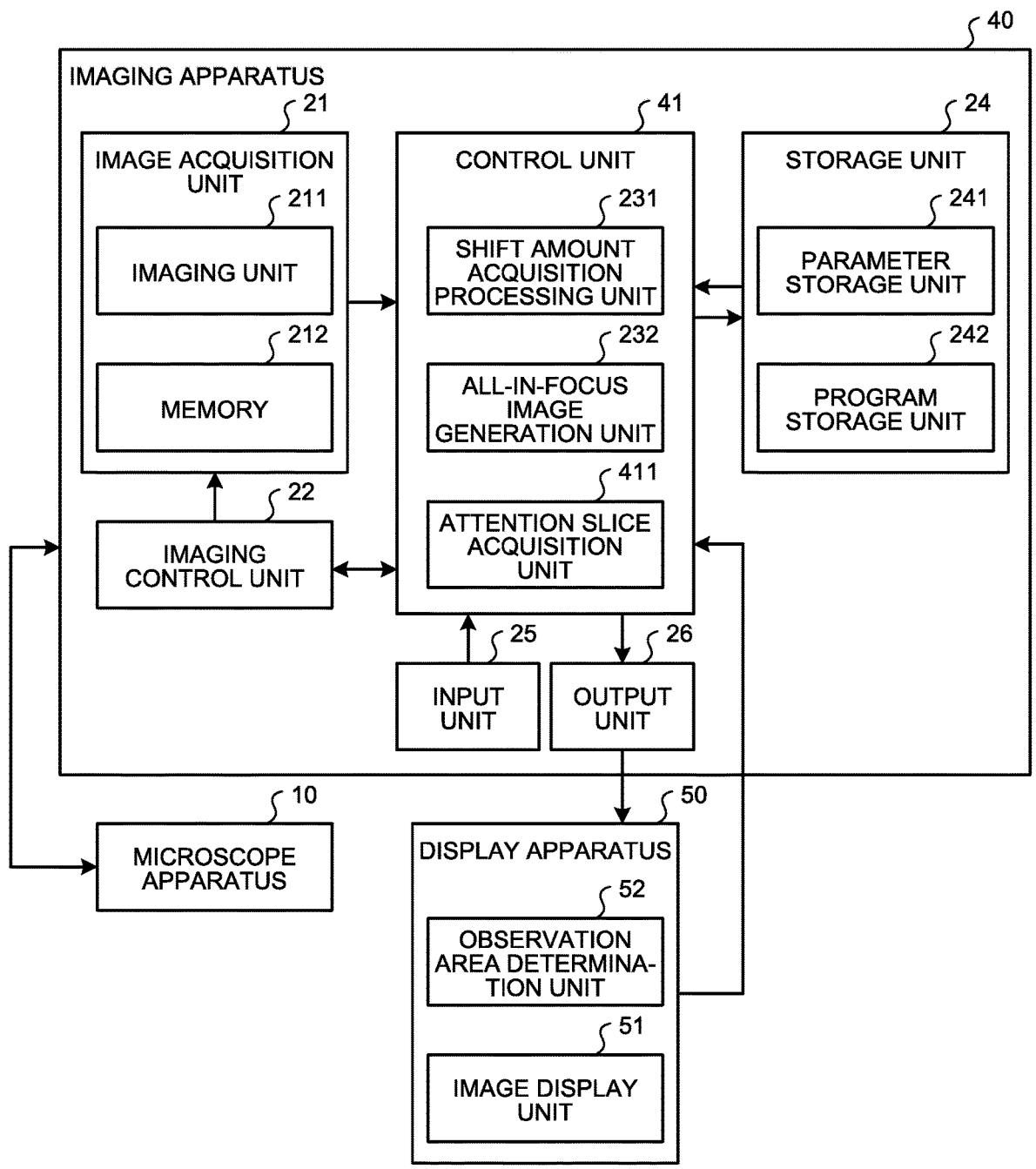
FIG. 13 is a block diagram illustrating an exemplary configuration of a microscopy system according to a second embodiment of the present disclosure.

Next, a second embodiment of the present disclosure will be described. FIG. 13 is a block diagram illustrating a configuration of a microscopy system according to the second embodiment of the present disclosure. As illustrated in FIG. 13, a microscopy system 2 according to the second embodiment includes a microscope apparatus 10, an imaging apparatus 40 that acquires and processes an image of an object image generated by the microscope apparatus 10, and a display apparatus 50 that displays the image and the like processed by the imaging apparatus 40. Among the components, the configuration and operation of the microscope apparatus 10 are similar to those in the first embodiment (refer to FIG. 2).

The imaging apparatus 40 includes a control unit 41 instead of the control unit 23 illustrated in FIG. 1. The control unit 41 further includes an attention slice acquisition unit 411, as compared with the control unit 23. The operations of the shift amount acquisition processing unit 231 and the all-in-focus image generation unit 232 are similar to those in the first embodiment.

The attention slice acquisition unit 411 acquires a Z-directional position of a slice including a structure in the object S corresponding to an observation area input from the display apparatus 50 described later via an input unit 25 and determines the slice as an attention slice.

The display apparatus 50 includes, for example, an LCD, an EL display or a CRT display, and is provided with an image display unit 51 that displays an image output from an output unit 26 and related information, and an observation area determination unit 52 that determines, as an observation area, an area in an all-in-focus image displayed in the image display unit 51, according to an operation performed from the outside and inputs a signal representing the observation area to the control unit 41.

Next, an operation of the microscopy system 2 will be described. FIG. 14 is a flowchart illustrating the operation of the microscopy system 2. Note that operations in steps S10 to S12 are similar to those in the first embodiment. Furthermore, FIGS. 15A-15D are schematic diagrams illustrating a plurality of multi-focus superimposed images $SI_i$ (i=31 to 34) generated in step S10. In the second embodiment, it is assumed that a plurality of all-in-focus images $AI_i$ is generated by restoring these multi-focus superimposed images $SI_i$, and sequentially switched and displayed on the image display unit 51.

In step S21 subsequent to step S12, the observation area determination unit 52 determines whether a user operation of selecting an observation area for any of the all-in-focus images $AI_{31}$, $AI_{32}$, $AI_{33}$, and $AI_{34}$ displayed on the image display unit 51 has been performed.

When the user operation has not been performed (step S21: No), the operation of the microscopy system 2 returns to step S12.

Figure 16:
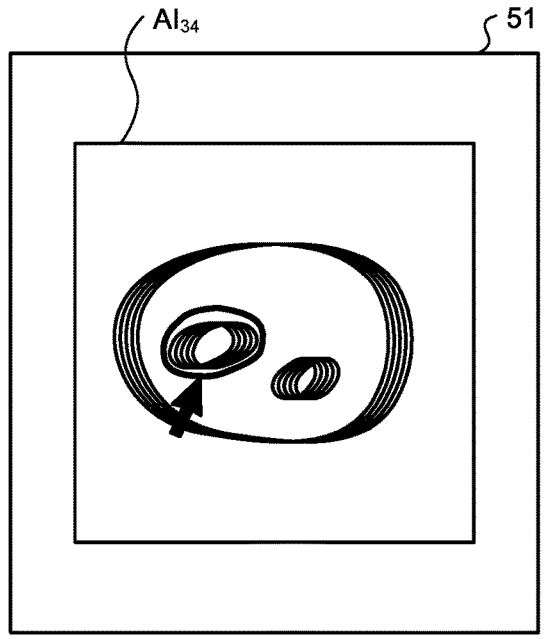
FIG. 16 is a schematic diagram illustrating an exemplary method of selecting an observation area.

On the other hand, when the user operation has been performed (step S21: Yes), the observation area determination unit 52 determines the area selected by the user operation as an observation area, and inputs a signal representing the observation area to the control unit 41 (step S22). FIG. 16 is a schematic diagram illustrating an exemplary method of selecting an observation area. As illustrated in FIG. 16, for example, an observation area is selected by surrounding a desired area in an all-in-focus image displayed on the image display unit 51 by a pointer operation using a mouse or the like.

Figure 17:
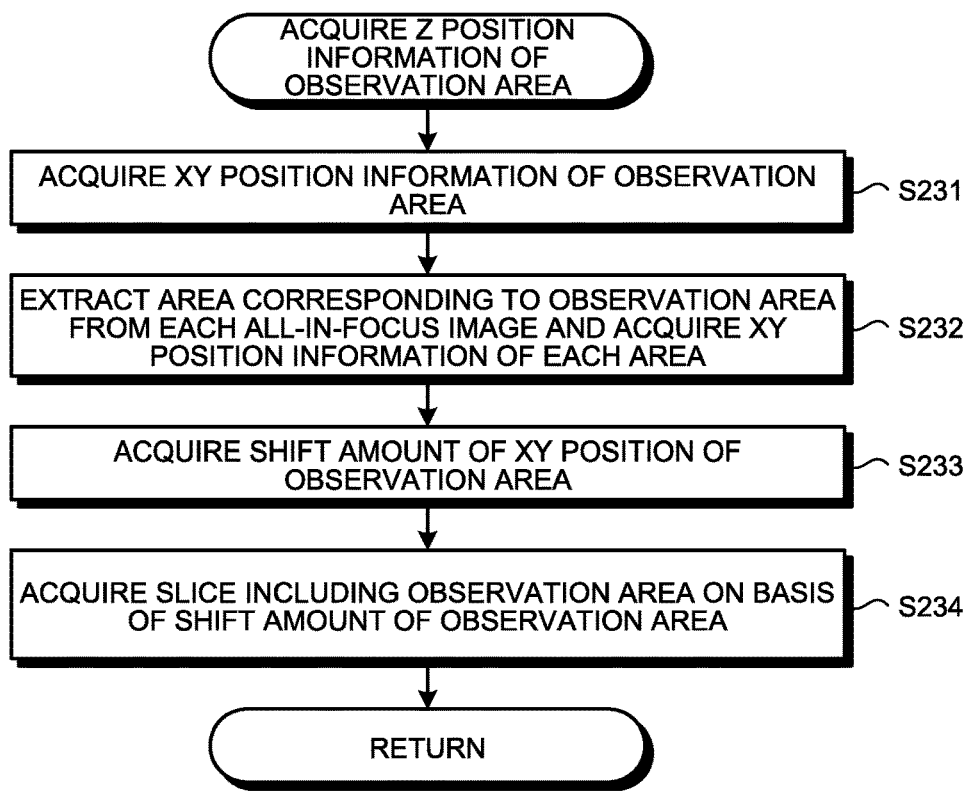
FIG. 17 is a flowchart illustrating details of processing of acquiring Z position information of the observation area.

In subsequent step S23, the control unit 41 acquires the Z position information of the observation area based on information representing the observation area that is input from the observation area determination unit 52. FIG. 17 is a flowchart illustrating details of processing of acquiring the Z position information of the observation area. In the following description, as an example, a case where an area $R_{34}$ within the all-in-focus image $AI_{34}$ illustrated in FIGS. 15A-15D is determined as an observation area will be described.

In step S231, the attention slice acquisition unit 411 acquires the XY position information of the observation area $R_{34}$ in the all-in-focus image $AI_{34}$.

In subsequent step S232, the attention slice acquisition unit 411 extracts areas $R'_{31}$, $R'_{32}$, and $R'_{33}$ corresponding to the observation area $R_{34}$ from the all-in-focus images $AI_{31}$, $AI_{32}$, and $AI_{33}$ other than the all-in-focus image $AI_{34}$, and acquires the XY position information of each area. The areas $R'_{31}$, $R'_{32}$, and $R'_{33}$ may be extracted using a known image recognition technique such as pattern matching. Hereinafter, these areas $R'_{31}$, $R'_{32}$, and $R'_{33}$ are also referred to as observation areas.

In subsequent step S233, the attention slice acquisition unit 411 acquires the shift amount of the observation areas $R'_{31}$, $R'_{32}$, $R'_{33}$, and $R_{34}$ in the XY position between the all-in-focus images $AI_{31}$, $AI_{32}$, $AI_{33}$, and $AI_{34}$. In the cases of FIGS. 15A-15D, there are acquired a shift amount between the X position of the observation area $R'_{31}$ in the all-in-focus image $AI_{31}$ and the position of the observation area $R'_{32}$ in the all-in-focus image $AI_{32}$, a shift amount between the X position of the observation area $R'_{32}$ in the all-in-focus image $AI_{32}$ and the position of the observation area $R'_{33}$ in the all-in-focus image $AI_{33}$, and a shift amount between the X position of the observation area $R'_{33}$ in the all-in-focus image $AI_{33}$ and the position of the observation area $R_{34}$ in the all-in-focus image $AI_{34}$.

In subsequent step S234, the attention slice acquisition unit 411 acquires a slice $F_j$ including these observation areas $R'_{31}$, $R'_{32}$, $R'_{33}$, and $R_{34}$ based on the shift amounts of the observation areas $R'_{31}$, $R'_{32}$, $R'_{33}$, and $R_{34}$.

Herein, when the shift amount in the all-in-focus image $AI_i$ is $\sigma_i$, the shift amount $s_{i,j}$ of the position of the field of view V in each slice $F_j$ with respect to the position of the field of view V in the slice $F_{j=0}$ at the uppermost surface is given by the following formula (6).

$$s_{i,j} = \sigma_i \times j \qquad (6)$$

Therefore, if the shift amount $|s_{(i+1),j} - s_{i,j}|$ between the observation areas $R'_{31}$, $R'_{32}$, $R'_{33}$ and $R_{34}$ is given, it is possible to identify the slice $F_j$ including the observation areas $R'_{31}$, $R'_{32}$, $R'_{33}$, and $R_{34}$ according to the following formula (7).

$$|s_{(i+1),j} - s_{i,j}| = \sigma_{i+1} \times j - \sigma_i \times j$$

$$j = |s_{(i+1),j} - s_{i,j}| / (\sigma_{i+1} - \sigma_i) \qquad (7)$$

Figure 15A:
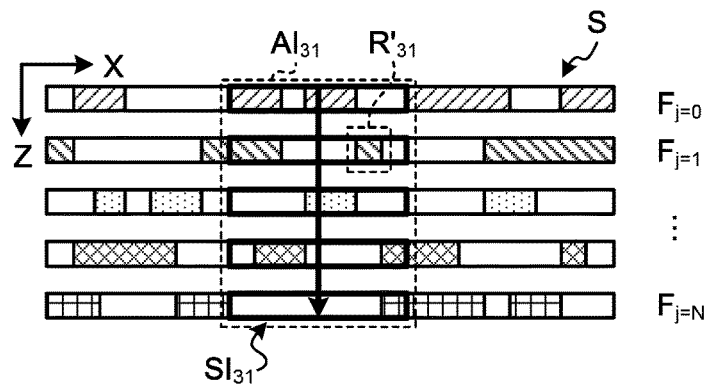
FIGS. 15A-15D are schematic diagrams illustrating the plurality of multi-focus superimposed images.
Figure 15B:
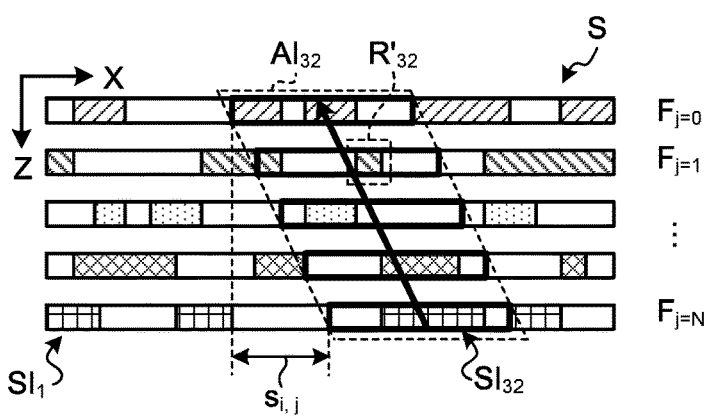
Figure 15C:
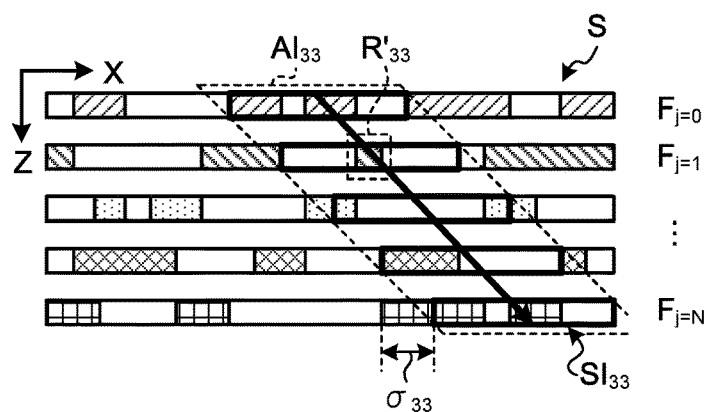
Figure 15D:
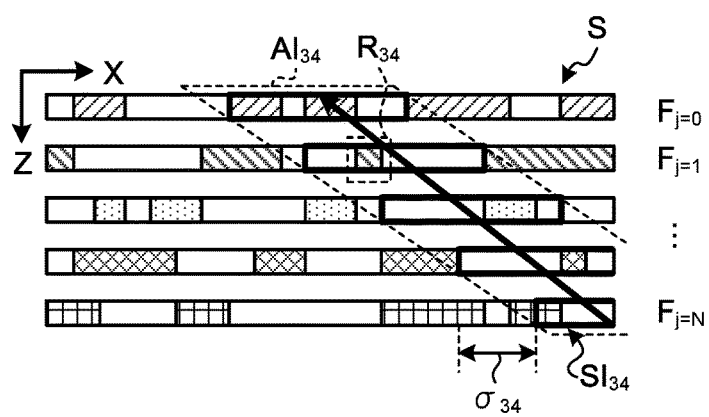

For example, as illustrated in FIGS. 15C and 15D, when the shift amount $\sigma_{33}$ in the all-in-focus image $AI_{33}$ is two pixels, the shift amount $\sigma_{34}$ in the all-in-focus image $AI_{34}$ is three pixels, and the shift amount between the observation areas $R'_{33}$ and $R_{34}$ is two pixels, j=2 is given from formula (7). That is, it may be seen that the observation area $R_{34}$ is included in a slice $F_{j=2}$.

The attention slice acquisition unit 411 outputs the slice $F_j$ acquired in this way as the Z position information of the observation area. Thereafter, the operation of the control unit 41 returns to the main routine.

In step S24 subsequent to step S23, the control unit 41 focuses on this Z position based on the Z position information output by the attention slice acquisition unit 411 and performs imaging. In this way, the control unit 41 acquires an image of the slice including the observation area and causes the display apparatus 50 to display the image of the slice. At this time, the control unit 41 may acquire and display, together with the image of the slice including the observation area, images of other slices adjacent to (that is, preceding and succeeding) the above slice. Thereafter, the operation of the microscopy system 2 ends.

According to the second embodiment of the present disclosure described above, it is possible for the user to intuitively and easily grasp Z-directional positions of structures that appear to overlap each other on a plane and an anteroposterior relationship between the structures.

Third Embodiment

Figure 18:
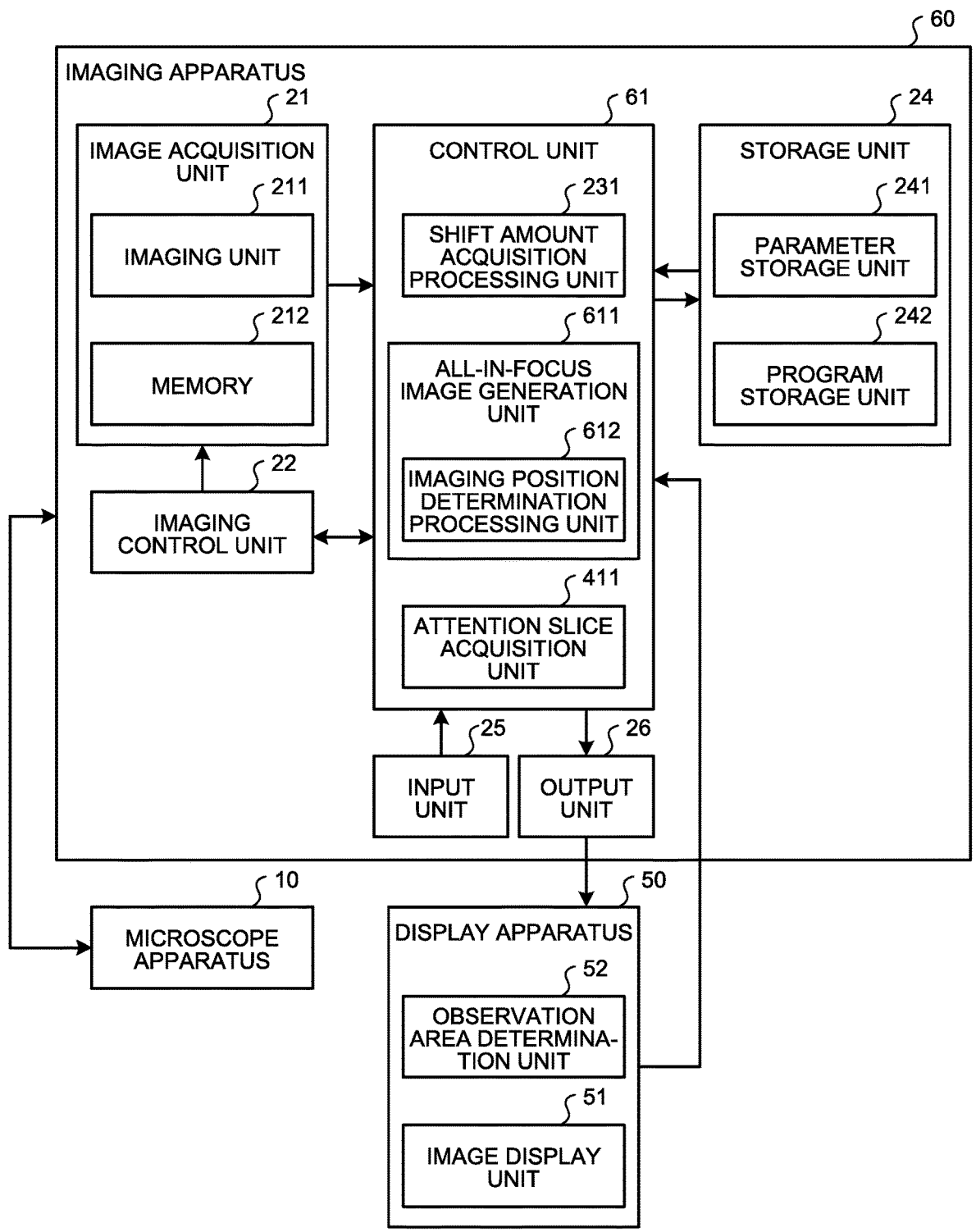
FIG. 18 is a block diagram illustrating an exemplary configuration of a microscopy system according to a third embodiment of the present disclosure.

Next, a third embodiment of the present disclosure will be described. FIG. 18 is a block diagram illustrating an exemplary configuration of a microscopy system according to the third embodiment of the present disclosure. As illustrated in FIG. 18, a microscopy system 3 according to the third embodiment includes a microscope apparatus 10, an imaging apparatus 60 that acquires and processes an image of an object image generated by the microscope apparatus 10, and a display apparatus 50 that displays the image and the like processed by the imaging apparatus 60. Among the components, the configuration and operation of the microscope apparatus 10 are similar to those in the first embodiment (refer to FIG. 2). Furthermore, the configuration and operation of the display apparatus 50 are similar to those in the second embodiment (refer to FIG. 13).

The imaging apparatus 60 includes a control unit 61 instead of the control unit 41 illustrated in FIG. 13. The control unit 61 includes an all-in-focus image generation unit 611 instead of the all-in-focus image generation unit 232, as compared with the control unit 41. The configuration and operation of each unit in the imaging apparatus 60 other than the control unit 61 and the configuration and operation of each unit in the control unit 61 other than the all-in-focus image generation unit 611 are similar to those in the third embodiment.

The all-in-focus image generation unit 611 includes an imaging position determination processing unit 612 that determines an imaging position at the time of acquiring a multi-focus superimposed image, based on a position of an attention slice determined by an attention slice acquisition unit 411.

Figure 19:
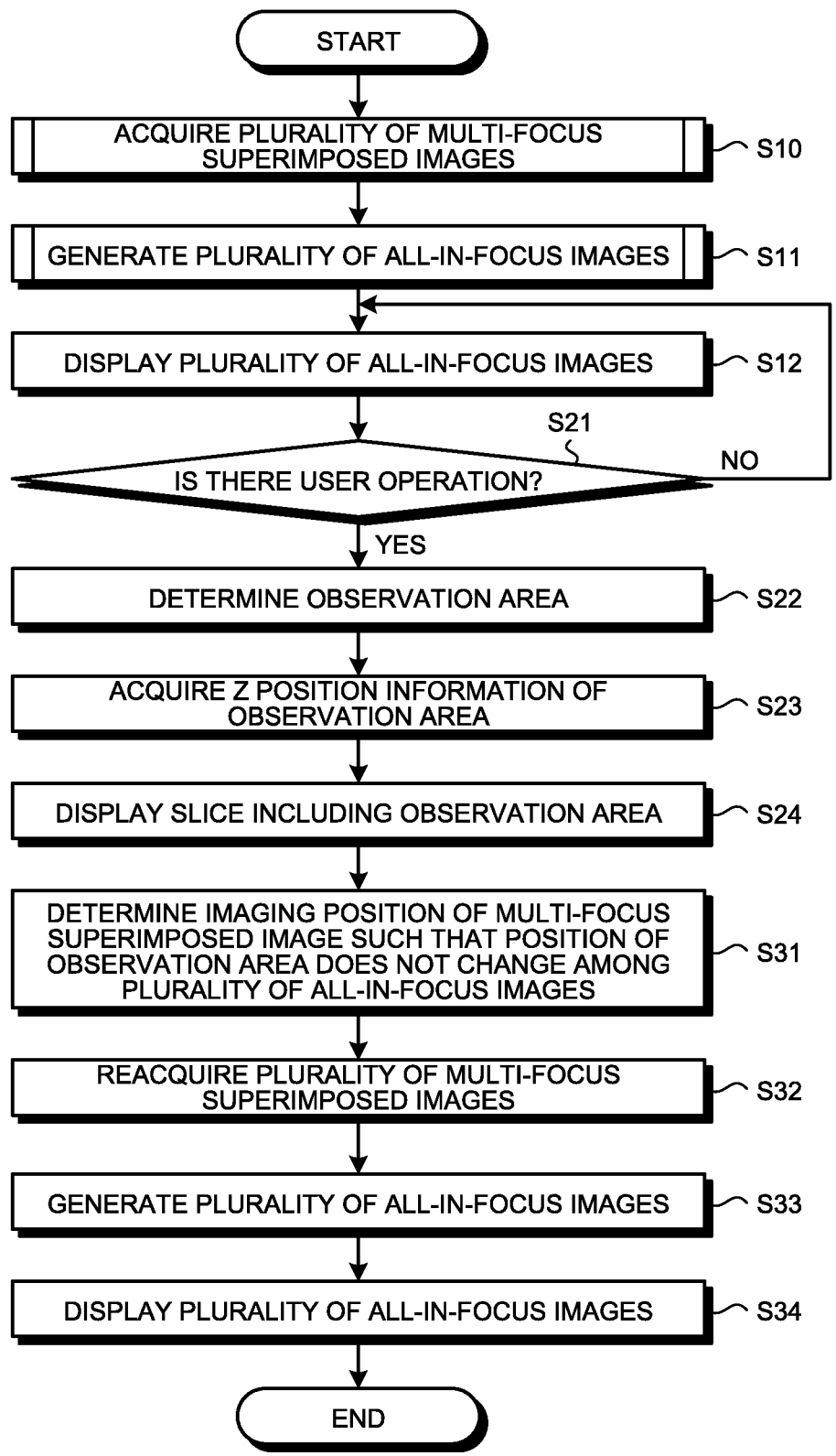
FIG. 19 is a flowchart illustrating an operation of the microscopy system illustrated in FIG. 18.
Figure 20A:
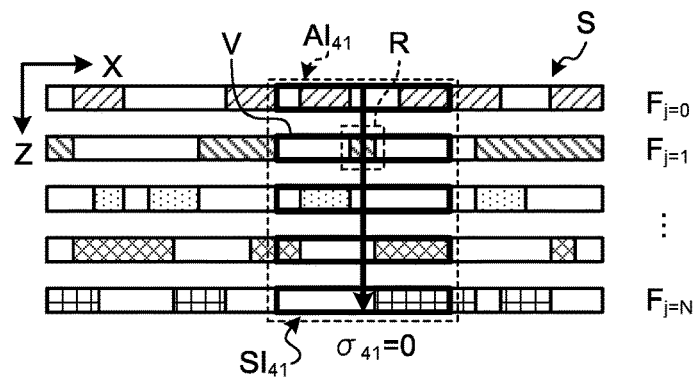
FIGS. 20A-20D are schematic diagrams for describing the operation of the microscopy system illustrated in FIG. 19.
Figure 20B:
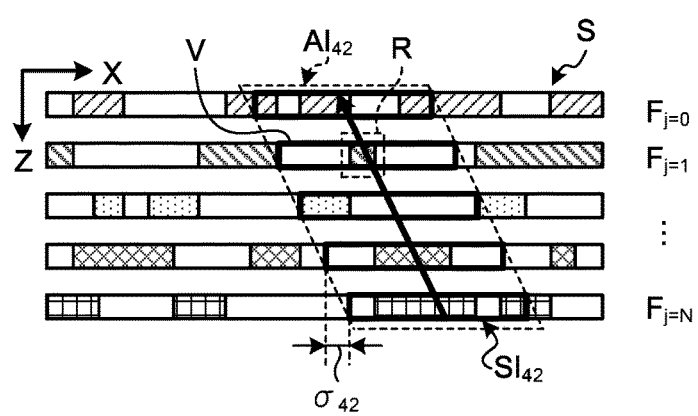
Figure 20C:
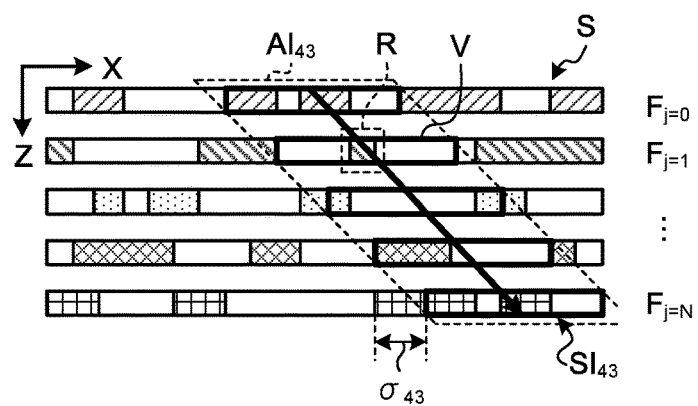
Figure 20D:
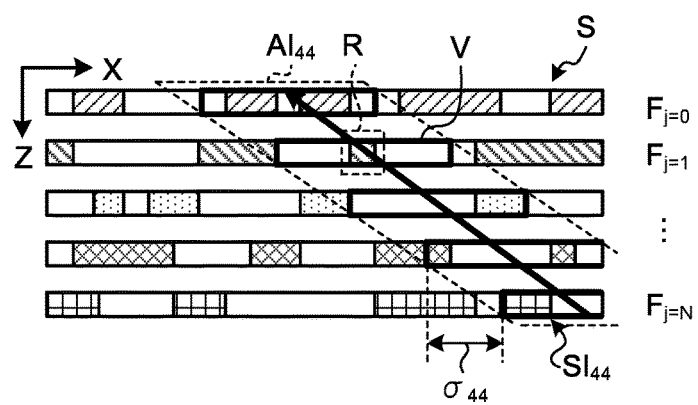

Next, the operation of the microscopy system 3 will be described. FIG. 19 is a flowchart illustrating the operation of the microscopy system 3. Note that steps S10 to S24 are similar to those in the second embodiment (refer to FIG. 14). Furthermore, FIGS. 20A-20D are schematic diagrams for describing the operation of the microscopy system 3. In the following description, it is assumed that an observation area R is determined in step S22, and it is found in step S23 that the observation area R is included in a slice $F_{j=2}$.

In step S31 subsequent to step S24, the imaging position determination processing unit 612 determines an imaging position at the time of acquiring a multi-focus superimposed image such that the position of the observation area determined in step S22 does not change among a plurality of all-in-focus images. For example, in the case of FIGS. 20A-20D, the imaging position determination processing unit 612 determines a position of a field of view V in the slice $F_{j=2}$ including the observation area R such that the position of the observation area R does not change among all-in-focus images $AI_{41}$, $AI_{42}$, $AI_{43}$, and $AI_{44}$. In FIGS. 20A-20D, the position of the field of view V is determined such that the observation area R is the center of the field of view V. An imaging start position of each of the multi-focus superimposed images $SI_{41}$, $SI_{42}$, $SI_{43}$, and $SI_{44}$ is calculated while taking the determined position of the field of view V as a reference, based on shift amounts $\sigma_{41}$, $\sigma_{42}$, $\sigma_{43}$, and $\sigma_{44}$ respectively set for the multi-focus superimposed images $SI_{41}$, $SI_{42}$, $SI_{43}$, and $SI_{44}$. With this imaging start position and the shift amounts $\sigma_{41}$, $\sigma_{42}$, $\sigma_{43}$, and $\sigma_{44}$, an imaging position with respect to each slice $F_j$ at the time of acquiring each of the multi-focus superimposed images $SI_{41}$, $SI_{42}$, $SI_{43}$, and $SI_{44}$ is determined.

In subsequent step S32, the imaging control unit 22 controls the position of a stage 131 and an imaging unit 211 based on the imaging position determined by the imaging position determination processing unit 612. In this way, the imaging control unit 22 reacquires a plurality of multi-focus superimposed images. The processing of reacquiring the plurality of multi-focus superimposed images is similar to that in step S11, except that imaging parameters are different.

In subsequent step S33, the all-in-focus image generation unit 611 generates a plurality of all-in-focus images by restoring the multi-focus superimposed images acquired in step S32 using a PSF function. This all-in-focus image generation processing is similar to that in step S12.

In subsequent step S34, the imaging apparatus 60 causes the display apparatus 50 to display the plurality of all-in-focus images generated in step S33. Thereafter, the operation of the microscopy system 3 ends.

As described above, according to the third embodiment of the present disclosure, it is possible to display the plurality of all-in-focus images having different virtual viewpoints without changing the position of the observation area selected by the user in the all-in-focus images. Therefore, the user may intuitively grasp the position of the observation area in the Z direction, the anteroposterior relationship with other structures, and the like without changing the line of sight to the observation area selected by the user.

Modification

Next, a modification of the third embodiment of the present disclosure will be described. In the third embodiment, the shift amount between adjacent slices in each multi-focus superimposed image is the same. However, the shift amount between the adjacent slices even in one multi-focus superimposed image may be changed.

Figure 21A:
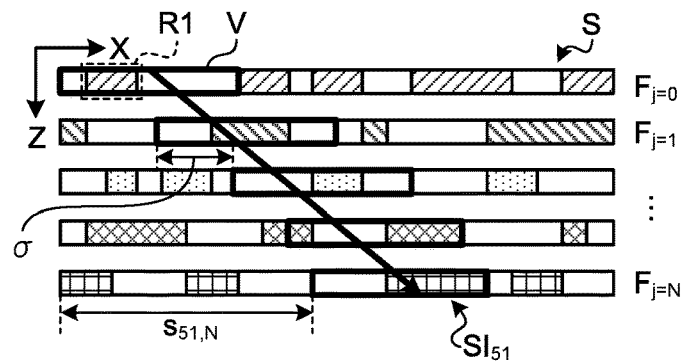
FIGS. 21A and 21B are schematic diagrams illustrating a method of shifting a position of a field of view in a modification of the third embodiment.
Figure 21B:
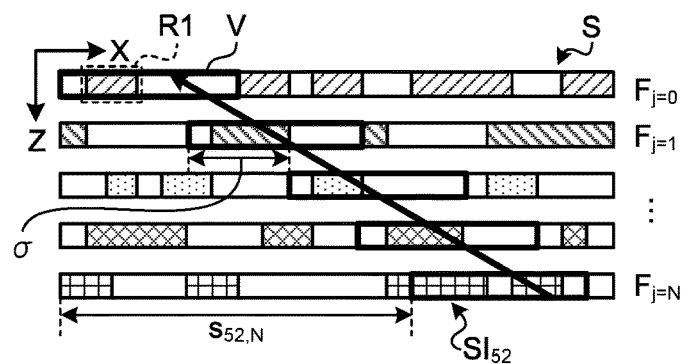

FIGS. 21A and 21B are schematic diagrams illustrating a method of shifting a position of a field of view according to the modification of the third embodiment. In FIGS. 21A and 21B, multi-focus superimposed images $SI_{51}$ and $SI_{52}$ are acquired such that the position of an observation area $R_1$ included in a slice $F_{j=1}$ does not change among a plurality of all-in-focus images.

If the shift amount of the position of the field of view V in each slice $F_j$ with respect to the position of the field of view V in the slice $F_{j=0}$ as a reference is compared between the multi-focus superimposed images $SI_{51}$ and $SI_{52}$ illustrated in FIGS. 21A and 21B, for example, the shift amounts $s_{51,N}$ and $s_{52,N}$ are compared, the shift amount in the multi-focus superimposed image $SI_{52}$ is larger. Furthermore, in each of the multi-focus superimposed images $SI_{51}$ and $SI_{52}$, the shift amount $\sigma$ of the position of the field of view V between adjacent slices increases as the adjacent slices are closer to the reference slice $F_{j=0}$.

Thus, the shift amount of the position of the field of view V between adjacent slices is increased as the adjacent slices are closer to the slice including the observation area to which the user pays attention. In this way, it is possible to easily grasp a structure of the slice to which the user pays attention.

Furthermore, in the third embodiment, the shift amount with respect to the field of view V in the uppermost slice $F_{j=0}$ or the lowermost slice $F_{j=N}$ is increased or decreased sequentially such that the positions of the field of view V in the respective slices $F_{j=0}$ to $F_{j=N}$ are aligned in one direction.

However, the increase and decrease of the shift amount of the position of the field of view may be changed according to the slice.

Figure 22A:
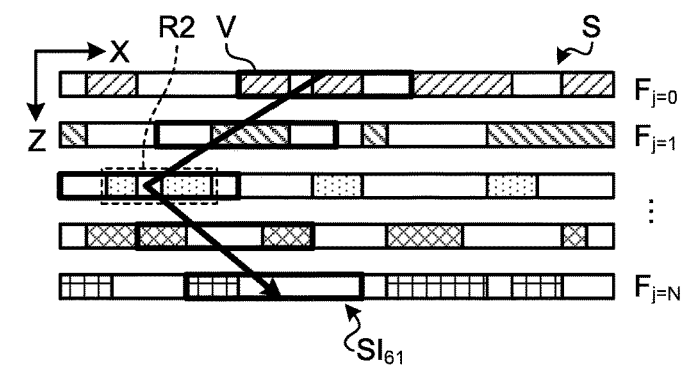
FIGS. 22A and 22B are schematic diagrams illustrating another method of shifting the position of the field of view in a modification of the third embodiment.
Figure 22B:
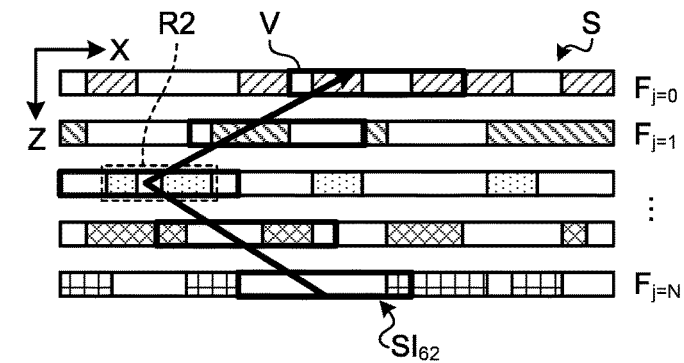

FIGS. 22A and 22B are schematic diagrams illustrating another method of shifting the field of view in the modification of the third embodiment. In FIGS. 22A and 22B, multi-focus superimposed images $SI_{61}$ and $SI_{62}$ are acquired such that the position of the observation area R2 included in a slice $F_{j=3}$ does not change among a plurality of all-in-focus images.

In the multi-focus superimposed images $SI_{61}$ and $SI_{62}$ illustrated in FIGS. 22A and 22B, an increase or decrease in a shift amount between adjacent slices is reversed at the slice $F_{j=3}$ including the observation area. As a result, even when an all-in-focus image is generated, it becomes possible to more prominently display the slice including the observation area selected by the user.

The above-described first to third embodiments and modifications are not limited as they are. It is possible to form various disclosures by appropriately combining a plurality of constituent elements disclosed in each embodiment and modifications. For example, the disclosures may be formed by excluding some constituent elements from all constituent elements illustrated in the embodiment. Alternatively, the disclosures may be formed by appropriately combining the constituent elements illustrated in different embodiments.

According to the present disclosure, a multi-focus superimposed image is acquired by shifting the focal plane and a position of a field of view during one exposure period of the imaging unit. Therefore, it is possible to drastically shorten imaging time and to greatly suppress a data amount and a calculation amount, as compared with a case where a multi-focus image is generated by acquiring a Z stack image and performing image processing. Furthermore, according to the present disclosure, all-in-focus images generated under conditions where shift amounts at a position of a field of view are different are displayed on a screen. Therefore, a user compares these all-in-focus images, thereby being able to visually and intuitively grasp a Z-directional position of a structure captured in an image and an anteroposterior relationship between the structures.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscopy system comprising:
    an image sensor configured to acquire an image by capturing an object image generated by an observation optical system of a microscope;
    an object stage configured to shift a focal plane and a position of a field of view of the observation optical system;
    a processor comprising hardware, the processor being configured to:
        cause the image sensor to acquire a multi-focus superimposed image including image information on planes in an optical axis direction of the observation optical system by shifting the focal plane and the position of the field of view during one exposure period of the image sensor;
        acquire a shift amount by which the position of the field of view is shifted;
        generate all-in-focus images based on multi-focus superimposed images, respectively, acquired under conditions in which the shift amounts are different;
        determine an area selected from any one of the all-in-focus images as an observation area in accordance with an operation performed from outside;
        extract an area corresponding to the observation area from, other than the one of the all-in-focus images from which the observation area is selected, another one of the all-in-focus images and acquire a position of a slice including a structure of an object corresponding to the observation area based on a shift amount between a position of the observation area in the one of the all-in-focus images from which the observation area is selected and a position of the area in the other one of the all-in-focus images from which the area is extracted; and
        display the all-in-focus images.

2. The microscopy system according to claim 1, wherein the processor is further configured to determine an imaging start position at a time of acquiring each of the multi-focus superimposed images based on the acquired shift amount.

3. The microscopy system according to claim 1, wherein the generation of the all-in-focus images comprises determining an imaging position at the time of acquiring a multi-focus superimposed image while shifting the position of the field of view of the observation optical system during the one exposure period of the image sensor, based on the position of the observation area in the one of the all-in-focus image from which the observation area is selected.

4. The microscopy system according to claim 3, wherein the determining of the imaging position determines the imaging position such that the position of the observation area in each all-in-focus image does not change among the all-in-focus images.

5. A microscopy method of acquiring an image by capturing, with an image sensor, an object image generated by an observation optical system of a microscope, the microscopy method comprising:
    acquiring a multi-focus superimposed image including image information on planes in an optical axis direction of the observation optical system by shifting a focal plane and a position of a field of view of the observation optical system during one exposure period of the image sensor;
    generating all-in-focus images based on multi-focus superimposed images, respectively, acquired under conditions in which shift amounts by which the position of the field of view is shifted are different;
    determining an area selected from any one of the all-in-focus images as an observation area in accordance with an operation performed from outside;
    extracting an area corresponding to the observation area from, other than the one of the all-in-focus images from which the observation area is selected, another one of the all-in-focus images and acquire a position of a slice including a structure of an object corresponding to the observation area based on a shift amount between a position of the observation area in the one of the all-in-focus images from which the observation area is selected and a position of the area in the other one of the all-in-focus images from which the area is extracted; and
    displaying the all-in-focus images.

6. A non-transitory computer-readable recording medium with an executable program stored thereon, the program acquiring an image by capturing, with an image sensor, an object image generated by an observation optical system of a microscope and causing a processor to execute:

acquiring a multi-focus superimposed image including image information on planes in an optical axis direction of the observation optical system by shifting a focal plane and a position of a field of view of the observation optical system during one exposure period of the image sensor;

generating all-in-focus images based on multi-focus superimposed images, respectively, acquired under conditions in which shift amounts by which the position of the field of view is shifted are different;

determining an area selected from any one of the all-in-focus images as an observation area in accordance with an operation performed from outside;

extracting an area corresponding to the observation area from, other than the one of the all-in-focus images from which the observation area is selected, another one of the all-in-focus images and acquire a position of a slice including a structure of an object corresponding to the observation area based on a shift amount between a position of the observation area in the one of the all-in-focus images from which the observation area is selected and a position of the area in the other one of the all-in-focus images from which the area is extracted; and displaying the all-in-focus images.

\* \* \* \* \*